(12) United States Patent
Aslan et al.

(10) Patent No.: US 9,772,882 B2
(45) Date of Patent: Sep. 26, 2017

(54) DETECTING AND SELECTING TWO PROCESSING MODULES TO EXECUTE CODE HAVING A SET OF PARALLEL EXECUTABLE PARTS

(71) Applicants: Halis Aslan, Hamburg (DE); Farbod Saremi, Hamburg (DE); Tobias Zielinski, Hamburg (DE); Hendrik Dürkop, Hamburg (DE)

(72) Inventors: Halis Aslan, Hamburg (DE); Farbod Saremi, Hamburg (DE); Tobias Zielinski, Hamburg (DE); Hendrik Dürkop, Hamburg (DE)

(73) Assignee: HYBRIDSERVER TEC IP GMBH, Hergiswil (CH)

( * ) Notice: Subject to any disclaimer, the term of this patent is extended or adjusted under 35 U.S.C. 154(b) by 430 days.

(21) Appl. No.: 13/827,380

(22) Filed: Mar. 14, 2013

(65) Prior Publication Data
US 2014/0237480 A1    Aug. 21, 2014

(30) Foreign Application Priority Data
Feb. 18, 2013 (EP) .................................. 13000810

(51) Int. Cl.
*G06F 9/46* (2006.01)
*G06F 7/38* (2006.01)
(Continued)

(52) U.S. Cl.
CPC .......... *G06F 9/5027* (2013.01); *G06F 9/5066* (2013.01); *G06F 8/456* (2013.01); *Y02B 60/142* (2013.01); *Y02B 60/167* (2013.01)

(58) Field of Classification Search
CPC ...... G06F 8/456; G06F 9/5066; G06F 9/5027; Y02B 60/142; Y02B 60/167
See application file for complete search history.

(56) References Cited

U.S. PATENT DOCUMENTS

| 8,196,127 B2 * | 6/2012 | Gschwind ..................... 717/154 |
| 2002/0078308 A1 | 6/2002 | Altman et al. |

(Continued)

FOREIGN PATENT DOCUMENTS

| JP | 2002144657 A | 5/2002 |
| JP | 2006004498 A | 1/2006 |

(Continued)

OTHER PUBLICATIONS

"Parallelization", XP-002697858, pp. 266-273, (1991).
(Continued)

*Primary Examiner* — Bing Zhao
(74) *Attorney, Agent, or Firm* — Brinks Gilson & Lione

(57) ABSTRACT

The execution of an executable code by a set of processing modules is provided, wherein the executable code is executed by at least one first processing module of the set of processing modules, wherein said executable code comprises a set of parallel executable parts, wherein each parallel executable part of the executable code comprises at least two parallel executable steps, and wherein said executing comprises: detecting by the at least one first processing module a parallel executable part of the set of parallel executable parts of the executable code to be executed; selecting by the at least one first processing module at least two second processing modules of the set of processing modules; and commanding by the at least one first processing module the selected at least two second processing modules to perform the at least two parallel executable steps of the detected parallel executable part of the executable code.

16 Claims, 16 Drawing Sheets

(51) Int. Cl.
    *G06F 9/45*         (2006.01)
    *G06F 9/50*         (2006.01)

(56) References Cited

U.S. PATENT DOCUMENTS

| | | |
|---|---|---|
| 2002/0135582 A1 | 9/2002 | Suzuoki et al. |
| 2007/0094561 A1* | 4/2007 | Udell ............... G01R 31/31707 714/738 |
| 2007/0130568 A1 | 6/2007 | Jung et al. |
| 2008/0155496 A1 | 6/2008 | Hatano et al. |
| 2009/0031310 A1* | 1/2009 | Lev et al. .................... 718/101 |
| 2011/0161643 A1* | 6/2011 | Eichenberger et al. ...... 712/241 |
| 2012/0246654 A1 | 9/2012 | Eichenberger et al. |

FOREIGN PATENT DOCUMENTS

| | | |
|---|---|---|
| JP | 2007193423 A | 8/2007 |
| JP | 2009524866 A | 7/2009 |
| JP | 2011204208 A | 10/2011 |
| JP | 2012242973 A | 12/2012 |

OTHER PUBLICATIONS

H. Zima and B. Chapman, *Supercompilers for Parallel and Vector Computers* (ACM Press Frontier Serires, Addison-Wesley, 1991) pp. 266-273 (9 pages total).
European Office Action dated Jan. 25, 2016.
Yusuke, Shimada, et al., "A Structured Language for Parallel Processing and Exception Handling," English abstract, The Graduate School of Science and Technology, Kobe University, Department of Computer and Systems Engineering Faculty of Engineering, Kobe University, ISSN 0919-6072, vol. 97, No. 78, cited in Japanese Office Action dated Mar. 14, 2017.

\* cited by examiner

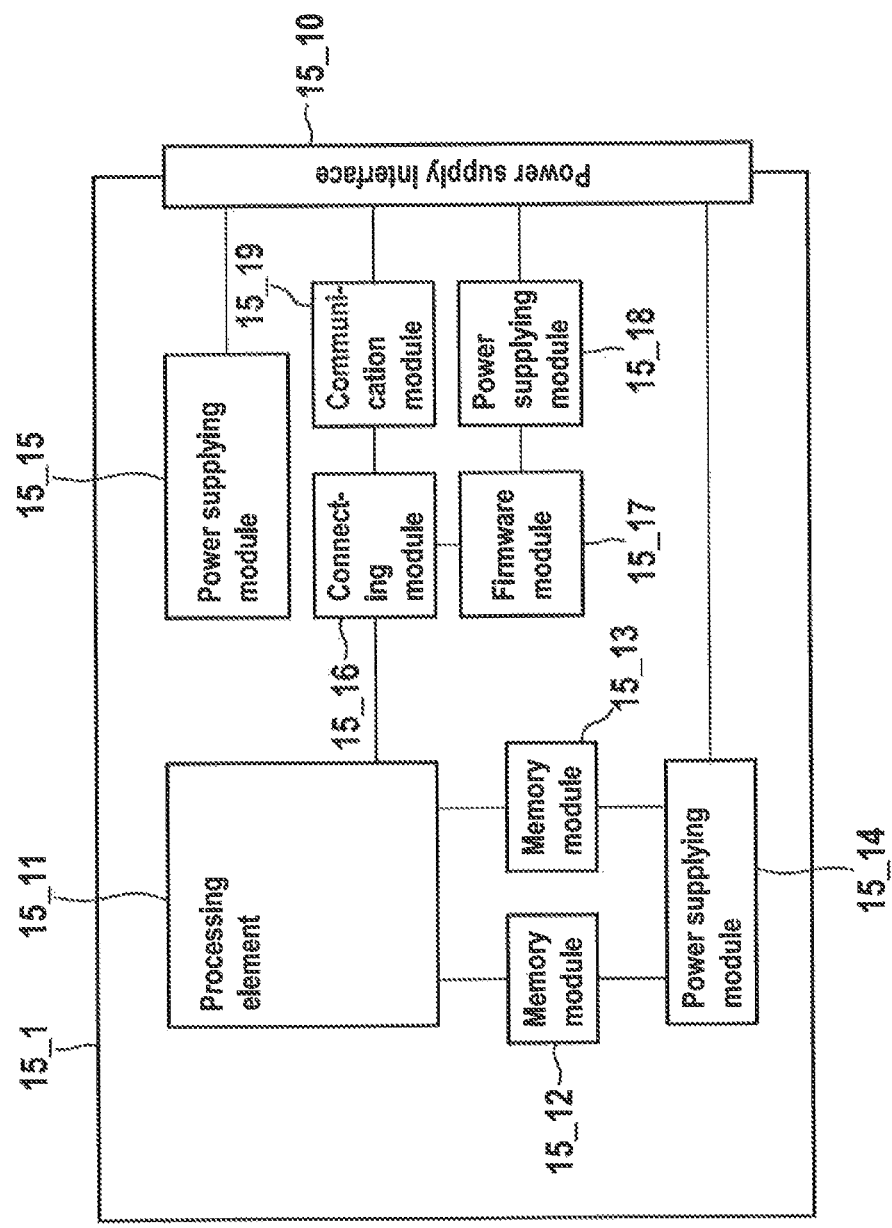

DETECTING AND SELECTING TWO PROCESSING MODULES TO EXECUTE CODE HAVING A SET OF PARALLEL EXECUTABLE PARTS

CROSS-REFERENCE TO RELATED APPLICATIONS

This application is based upon and claims the benefit of priority from European Patent Application No. 13 000 810.5, filed Feb. 18, 2013, the entire contents of which are incorporated herein by reference.

FIELD OF THE INVENTION

The present invention relates to a processing module configured to execute an executable code and to a method for executing the executable code. Further, the present invention refers to a system in general and to a server system comprising the processing modules. Additionally, the present invention refers to a computer readable medium capable of carrying out said method for executing the executable code.

BACKGROUND OF THE INVENTION

Nowadays, large data amounts become available through the rapidly developing communication and computing techniques. Areas like network services e.g. web servers or image processing are prominent examples for managing, processing and handling large data amounts. This presence of large scale data requires techniques and devices that are capable of handling the data in a fast, convenient and resource saving way. The devices and, particularly, the hardware handling said data have to be of small size for enabling space saving solutions, reliable, fast with regard to performing computing operations on the data, efficient and low energy consuming.

US 2002/0078308 A1 relates to the field of Symmetric Multi-Processing (SMP) systems, and more particularly to an SMP system where attached processing units have restricted access to a shared memory without being structurally configured with an address translation mechanism.

US2002/0135582 A1 provides a computer architecture and programming model for high speed processing over broadband networks. The architecture employs a consistent modular structure, a common computing module and uniform software cells. The common computing module includes a control processor, a plurality of processing units, a plurality of local memories from which the processing units process programs, a direct memory access controller and a shared main memory. A synchronized system and method for the coordinated reading and writing of data to and from the shared main memory by the processing units also are provided. A hardware sandbox structure is provided for security against the corruption of data among the programs being processed by the processing units. The uniform software cells contain both data and applications and are structured for processing by any of the processors of the network. Each software cell is uniquely identified on the network. A system and method for creating a dedicated pipeline for processing streaming data also are provided.

Known hardware/software solutions do not improve any or at least most of the above-listed criteria. Therefore, there is still a need for improved hardware/software solutions for managing, processing and/or handling large data amounts, large data traffic and/or large data throughput.

SUMMARY OF THE INVENTION

The present invention is based on the idea that at least a part of an executable code is executed by more than one processing module. The selection of the processing modules for execution of a part of the executable code may depend on several criteria like the structure of the corresponding part, the amount of data to be handled, the hardware and/or software environment of the processing modules. Each of the parallel executable parts is recognizable or detectable during the execution of the code. The decision on processing modules is done during the execution of the code such that an optimal selection of processing units for executing the part of the code in common is achieved. In this way, an efficient, reliable and fast handling of large data amounts is enabled. Further, an appropriate use of the processing units allows arrangement and implementation of hardware that is as small as possible with regard to further components, units or modules of said hardware becomes possible. Moreover, an energy saving handling of the large data amounts is enabled due to appropriate selecting of processing units for handling parts of code, the execution of which is done by more than one of the processing units. Furthermore, when arranging hardware with the processing modules, the present invention takes into account that the modules/elements/components of the hardware that communicate, interact and/or are connected to each other are located near to each other such that the least possible amount of connecting lines and/or connectors are necessary. In this way, the energy consumption, signal noise produced by the modules/elements/components, space required by the modules/elements/components, shielding of the modules/elements/components and/or cooling for the modules/elements/components may be reduced.

Particularly, the advantages of the present invention are achieved by appended independent claims. Further aspects, embodiments and features of the present invention are specified in the appended dependent claims and in the description and also make a contribution to achieving said advantages.

According to an embodiment of the present invention, a set of processing modules is provided that comprises at least one first processing module configured to: execute an executable code, wherein said executable code comprises a set of parallel executable parts, wherein each parallel executable part of said set of parallel executable parts of the executable code comprises at least two parallel executable steps; detect a parallel executable part of the set of parallel executable parts of the executable code as a part of the executable code to be executed; select at least two second processing modules of the set of processing modules; and command the selected at least two second processing modules to perform the at least two parallel executable steps of the detected parallel executable part of the executable code.

According to an embodiment, the executable code is based on source code. The source code may be readable by e.g. interpreters or compilers for generating executable code. The source code and in a similar way also the executable code comprises a plurality of instructions such as computer instructions, which usually are written in a computer language. The source code represents a text written in the corresponding computer language. The instructions and, thus, the source code or executable code respectively instructs a computing entity like the processing modules to perform specific computations or actions within the environment or system, in which the computing entity or processing module respectively is implemented.

The source code might be transformed by a compiler program into a low-level machine code understood by the computer. In this case, the machine code might then be stored for execution at a later time. The executable code refers then indirectly to the source code and represents rather the machine code. Similarly to the source code, the machine code comprises the instructions as described above. The instructions of the machine code correspond to the respective instructions of the source code and are written just in another language—e.g. the machine code.

When the executable code refers to the source code directly, an interpreter entity, for example, can be used to analyze and perform the effects of the source code program directly on the fly.

Independent of the kind of code, to which the executable code in a particular case refers, the executable code is to be understood such that it comprises instructions that are read and performed/executed by one or more computing or processing modules during the execution of the executable code. The skilled person is aware of the meaning of the terms "executable code" and "instructions". The executable code is a code of an application, a software program or a software system, for example.

As mentioned, the executable code may be composed of or is partitioned in at least one part, according to an embodiment, in more parts. As outlined above, some of said parts may be parallel executable parts. The executable code comprises at least one parallel executable part, i.e. the set of parallel executable parts comprises at least one corresponding part. The parallel executable part is defined such that it comprises at least two steps that are performed independently from each other, i.e. the execution of one step does not influence the execution of another. Each of the steps comprises a corresponding set of instructions as outlined above. Particularly each of the steps comprises at least one instruction. The terms "parallel executable" or "execution or performing in parallel" mean that the corresponding steps with the corresponding instructions of the corresponding part are performed at least partially at the same time. According to an embodiment, they are performed simultaneously or substantially simultaneously, i.e. with a time offset that may occur, e.g. at random.

The set of processing modules comprises at least two processing modules. A processing module may be, for example, an independent central processing unit also called core or processor core.

As mentioned above, the decision on processing modules that have to perform a parallel executable part of the executable code is met during the execution of the code, i.e. when the code is executed by at least one of the processing modules of said set of processing modules. In this way, the current situation with regard to the hardware and software environment of the processing modules, the amount of data etc. may be taken into account. Further, parts of the code, that handle large amounts of data and may be performed by more than one processing module, may be efficiently executed by at least two processing modules, according to an embodiment, by a plurality of processing modules. This enables an efficient, reliable and fast handling of large data amounts. The appropriate use of the processing units allows arrangement and implementation of hardware that is as small as possible. Moreover, an energy saving handling of the large data amounts is enabled due to appropriate selecting of processing units for executing parts of code in common.

According to an embodiment of the present invention, the performing of the at least two parallel executable steps are done at least partially at the same time, e.g. substantially in parallel or in parallel. In this way, a fast computation and processing of data by the processing modules is enabled, what, in turn, leads to an efficient hardware and software system for processing large amounts of data.

According to an embodiment of the present invention, the at least one first processing module is configured to execute said commanding by allocating each of the at least two of the parallel executable steps of the detected parallel executable part of the executable code to one of the selected at least two second processing modules. In this way, a broad distributing of the execution of the parallel executable steps among the processing modules is enabled. This leads to an improved performance and efficiency of the processing modules.

According to an embodiment of the present invention, at least one first processing module configured to command each of the selected at least two second processing modules to perform at least one of the at least two parallel executable steps of the detected parallel executable part of the executable code. In this way, also the amount of the available processing modules that are capable of performing the parallel executable steps is taken into consideration. Thus, an efficient distribution of the parallel executable steps is enabled, what, in turn, leads to an improved efficiency of the processing modules.

According to an embodiment of the present invention, the selected at least two second processing modules comprise the at least one first processing module. In this way, each processing module of the set of processing modules is involved when performing computations on and processing of large data amounts. Thus, a fast, efficient and effective operation of the whole set of processing modules is enabled.

According to an embodiment of the present invention, the at least one first processing module is configured to command performing a first and a second parallel executable parts of the executable code if a first part of the executable code is comprised in a second part of the executable code. Thus, each possibility of distributing computations on and processing of large data amounts is used, what, in turn, leads to an efficient, effective and fast operation of the whole set of processing modules with regard to the large amounts of data.

According to an embodiment of the present invention, each parallel executable part of the set of parallel executable parts of the executable code comprises steps of one certain parallelization type. In this way a structured execution of the executable code is enabled that leads to an improved performance of the processing modules. According to a further embodiment of the present invention, two parallelization types are distinct. Further, according to an embodiment of the present invention, a first parallelization type comprises program loops and wherein the second parallelization type comprises conditional branches.

According to an embodiment of the present invention if the detected parallel executable part of the set of parallel executable parts of the executable code comprises steps of a program loop as the at least two parallel executable steps, the at least one first processing module is configured to allocate a certain number of cycles of the program loop to each of the selected at least two second processing modules, wherein each cycle of the program loop is allocated to one of the selected at least two second processing modules; if the detected parallel executable part of the executable code comprises a set of program loops as the at least two parallel executable steps, the at least one first processing module is configured to allocate each of the program loops of the set of program loops to one of the selected at least two second processing modules; if the detected parallel executable part of the executable code comprises at least two conditional branches as the at least two parallel executable steps, the at least one first processing module is configured to allocate each conditional branch to one of the selected at least two second processing modules; and/or if the detected parallel executable part of the executable code comprises at least two conditional branches as the at least two parallel executable steps, the at least one first processing module is configured to allocate each condition of the at least two conditional branches to one of the selected at least two second processing modules and each part of code of the at least two conditional branches coded with regard to one condition of the at least two conditional branches to one of the selected at least two second processing modules.

In this way, a further optimizing of the performing parallel executable steps of a parallel executable part by a plurality of processing modules is enabled, wherein each possibility for execution of the parallel executable part is used. This improves the performance, the computation time and the efficiency of the set of processing modules.

According to an embodiment of the present invention, the set of processing modules is comprised in one processing element or in at least two processing elements. In this way, the processing modules are placed on a relatively small area, and implementing of hardware of small size becomes possible. Further, the communication ways among the processing modules are reduced. In this way, an energy consumption saving, resource saving, efficient and fast operating of the processing modules is enabled.

According to an embodiment of the present invention, the one processing element comprises a cell processor or cell chip respectively or the at least two processing elements comprise at least one cell processor or cell chip respectively. In this way, a fast and efficient processing of large data amounts is supported. The cell processor or cell chip respectively is know as having a microprocessor architecture that combines a general-purpose power architecture core of modest performance with streamlined co-processing elements. An example for a cell processor is e.g. IBM's PowerXCell 8i processor or Sony's Cell B.E.

According to a further embodiment of the present invention, the at least one first processing module comprises a power processor element and the at least two second processing modules comprise at least one power processor element and/or at least one synergistic processing element. In this way, a fast and efficient processing of large data amounts is supported.

According to an embodiment of the present invention, a method for executing an executable code by a set of processing modules is provided, wherein the method comprises executing the executable code by at least one first processing module of the set of processing modules, wherein said executable code comprises a set of parallel executable parts, wherein each parallel executable part of the executable code comprises at least two parallel executable steps, and wherein said executing comprises: detecting by the at least one first processing module a parallel executable part of the set of parallel executable parts of the executable code to be executed; selecting by the at least one first processing module at least two second processing modules of the set of processing modules; and commanding by the at least one first processing module the selected at least two second processing modules to perform the at least two parallel executable steps of the detected parallel executable part of the executable code.

In particular, the method is configured to execute the steps explained with regard to the set of processing modules in the present application. Thus, the corresponding steps represent also the steps of the above-mentioned method. By use of the method, the same positive effects as outlined with regard to the set of processing modules are achieved.

According to an embodiment of the present invention, a system comprising the set of processing modules as outlined above and explained in the subsequent description is provided. Thus, a whole hardware and software system may benefit from the positive effects as outlined with regard to the set of processing modules.

According to an embodiment of the present invention, the system comprises at least one of the following one processing element comprising the set of processing modules or at least two processing elements comprising the set of processing modules; at least one memory module connected to the one processing element or to one of the at least two processing elements and configured to provide memory capacity to the one processing element or to one of the at least two processing elements; a first power supplying module configured to provide power to the at least one memory module; a second power supplying module configured to provide power to the set of processing modules; a communication module configured to: receive data from a network and to provide the received data to the set of processing modules and/or receive data from the set of processing modules and to transmit the received data to the network; a firmware comprising software for the device; a third power supplying module configured to provide power to the firmware; a connecting module configured to connect the firmware, the network chip module and the one processing element or to connect the firmware, the network chip module and the at least two processing elements; and/or a power supply interface module configured to provide power to the first, second and third power supplying modules and to the communication module.

According to a further embodiment of the present invention the one processing element comprises a cell processor or the at least two processing elements comprise at least one cell processor; the at least one memory module comprises at least one random access memory; the power supply interface module is a peripheral component interconnect (PCI) or peripheral component interconnect express (PCI Express); the communication module is a network chip module, a peripheral component interconnect express switch or uplink module; the firmware is a flash, a field-programmable gate array (FPGA) or unified extensible firmware interface (UEFI); and/or the connecting module is an interconnect chip that is configured to manage input/output (I/O) functions.

In this way, a modular arrangement of components around the set of processing modules is enabled, wherein as less as possible components are comprised in the system such that a simple production of the system with reduced amount of required components is enabled. Additionally, the components of the system that are connected to each other, that communicate or interact with each other are placed near to each other. In this way the space for arranging the system is reduced, what, in turn, leads to the possibility of implementing small size units and to energy consumption reduction. Additionally, also the performance and efficiency of the system are improved.

According to an embodiment of the present invention, a server system comprising the set of processing modules as outlined above and as explained below in more detail. In this way, also a server system is configured such that it provides all of the positive effects listed in the present application. Additionally, introduction and/or use of existing data center infrastructures/components/modules/elements is enabled at the same time.

According to an embodiment of the present invention, a computer readable medium comprising a program code, which, when executed by a computing device, causes the computing device to carry out a method as outlined above and explained in more detail below.

As can be derived from the aforesaid and as it becomes apparent from the below explanation of the present invention, the present invention provides a method, a set of processing modules, a system, which, amongst others, allow increased data amounts, increased data traffic and/or improved data throughput to be handled, provide a reduced signal noise, and/or allow a reduction of shielding, reduced cooling efforts, reduced power consumption and/or reduced space.

BRIEF DESCRIPTION OF THE DRAWINGS

Further advantages and embodiments of the present invention are included in the dependent claims and will be better understood from the description below of embodiments, with reference to the accompanying drawings, in which:

FIG. 15 shows an implementation of a system comprising one processing element according to an embodiment of the present invention;

DETAILED DESCRIPTION OF THE INVENTION

The following paragraphs will describe various embodiments of the invention. For exemplary purposes only, most of the embodiments are outlined in relation to microprocessor architecture and the terminology used in the subsequent sections mainly relates to that technology. However, the used terminology and the description of the embodiments with respect to a microprocessor are not intended to limit the principles and ideas of the inventions to such systems.

Also the detailed explanations given in the Background of the Invention section above are merely intended to better understand the mostly microprocessor architecture specific exemplary embodiments described in the following and should not be understood as limiting the invention to the described specific implementations of processes and functions.

The ideas and principles that will be outlined in the subsequent sections may be applicable to systems providing more general microprocessor architecture concepts.

Figure 1A:
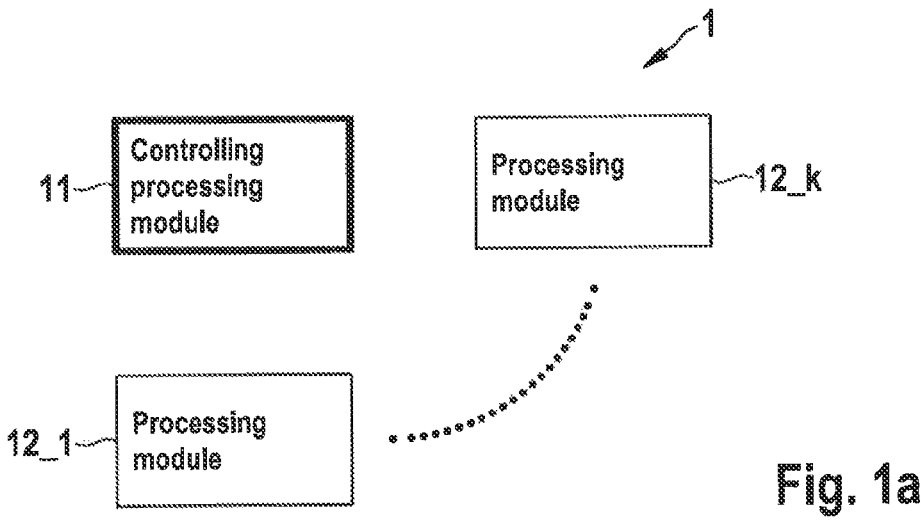
FIG. 1a shows a set of processing modules configured according to an embodiment of the present invention.

FIG. 1a shows a set 1 of processing modules 11, 12_1 to 12_k configured according to an embodiment of the present invention. The processing modules 11, 12_1 to 12_k are, for example, processors. The set 1 of processing modules 11, 12_1 to 12_k is configured to execute an executable code. At least one of the processing modules 1, 12_1 to 12_k is configured to control the execution of the code. In FIG. 1a, this controlling processing module is highlighted by bold lines of the corresponding box 11. The further processing modules 12_1 to 12_k are configured to perform steps of parallel executable parts of the code.

The controlling processing module 11 is configured to execute the executable code. When, during the execution of the code, the controlling processing module 11 arrives at a part of the executable code that might be executed in a parallel way and that has to be executed next, i.e. when the controlling processing module 11 detects or recognizes a parallel executable part of the executable code, the controlling processing module 11 selects at least two processing modules 11, 12_1 to 12_k of the set 1 of processing modules 11, 12_1 to 12_k for performing/executing the detected or recognized parallel executable part.

According to an embodiment of the present invention, the parallel executable part is marked in the executable code as being suitable for parallel execution. Here, the start and the end of the parallel executable part may be marked accordingly in the executable code. To this, several appropriate techniques might be applied. For example, according to an embodiment, a call and pre-specified call for executing a particular function with regard to said part of the code, specific commands marking the start and the end of said part of the code or further pre-defined functions or instructions are used for marking a parallel executable part in the code. In this way, the controlling processing module 11 executing the code detects the corresponding marker as the next instruction of the executable code to be executed and, thus, detects the parallel executable part to be executed next.

After determining the parallel executable part, the controlling processing module 11 selects at least two processing modules 11, 12_1 to 12_k of the set 1 of processing modules 11, 12_1 to 12_k for performing/executing the detected or recognized parallel executable part. The at least two processing modules 11, 12_1 to 12_k may comprise the controlling processing module 11. Alternatively, the at least two processing modules 11, 12_1 to 12_k may comprise processing modules 12_1 to 12_k other than the controlling processing module 11.

Subsequently, after the selecting of processing modules 11, 12_1 to 12_k for performing the detected parallel executable part of the code, the controlling processing module 11 commands the selected processing modules 11, 12_1 to 12_k to perform the steps at least two of the parallel executable part. Here, the controlling processing module 11 allocates each of the steps of the detected parallel executable part to one of the selected processing modules 11, 12_1 to 12_k. Further, to each of the selected processing modules 11, 12_1 to 12_k at least one of said steps is allocated. Thus, some or each of the selected processing modules 11, 12_1 to 12_k might execute more than one of said steps. In other cases, the allocation of the parallel executable steps to the selected processing modules 11, 12_1 to 12_k might be such that at least one of the selected processing modules 11, 12_1 to 12_k has no parallel executable step allocated to it. This, for example, may be true for situations, where more processing modules 11, 12_1 to 12_k are selected than parallel executable steps are present at that time of execution. For example, it might happen that the number of parallel executable steps of a parallel executable part cannot be predetermined exactly. If such situation occurs, some of the selected processing modules 11, 12_1 to 12_k will have no step for execution. Otherwise, it may happen that during the allocation, it appears appropriate not to use one or some of the selected processing modules 11, 12_1 to 12_k, e.g. due to the changes in the hardware and/or software environment and that, therefore, no parallel executable step is allocated to said one or some of the selected processing modules 11, 12_1 to 12_k.

The execution of the allocated steps might be done substantially in parallel or subsequently by the processing module 11, 12_1 to 12_k, to which said steps have been allocated. The selected processing modules 11, 12_1 to 12_k start to execute or execute their one or more allocated steps after receiving a corresponding command/instruction from the controlling processing module 11. The selected processing modules 11, 12_1 to 12_k, which currently or at given time execute their allocated steps, are performing their allocated steps at least partially at the same time, i.e. at least partially parallel to each other. The controlling processing module 11 might command the selected processing modules 11, 12_1 to 12_k to perform the corresponding steps subsequently and/or at least partially in parallel. Thus, it is possible that one group of the parallel executable steps is executed at least partially parallel to each other while another group of parallel executable steps that is executed later on at least partially parallel to each other. Therefore, it may happen that some of the parallel executable steps are executed by a first subset of selected processing modules 11, 12_1 to 12_k while the other group of parallel executable steps is executed by a second subset of the selected processing modules 11, 12_1 to 12_k. The first and second subset of selected processing modules 11, $12_{13}$ 1 to 12_k may overlap or be equal.

According to an embodiment of the present invention, the set 1 of processing modules 11, 12_1 to 12_k comprises more than one controlling processing module 11. In this case, the corresponding controlling processing modules 11, 12_1 to 12_k are configured to communicate with each other and to share the tasks of the code execution and, particularly, the tasks of the control of the code execution. According to said embodiment, to each of the controlling processing modules 11, 12_1 to 12_k corresponding further processing modules 11, 12_1 to 12_k of the set 1 are allocated. Thus, each of the controlling processing modules 11, 12_1 to 12_k selects only such processing modules 11, 12_1 to 12_k for performing the corresponding parallel executable part that are allocated to it. According to a further embodiment of the present invention, the processing modules 11, 12_1 to 12_k allocated to two controlling processing modules 11, 12_1 to 12_k may overlap. Thus, some of the processing modules 11, 12_1 to 12_k of the set 1 are selected by at least two of the controlling processing modules 11, 12_1 to 12_k.

Figure 1B:
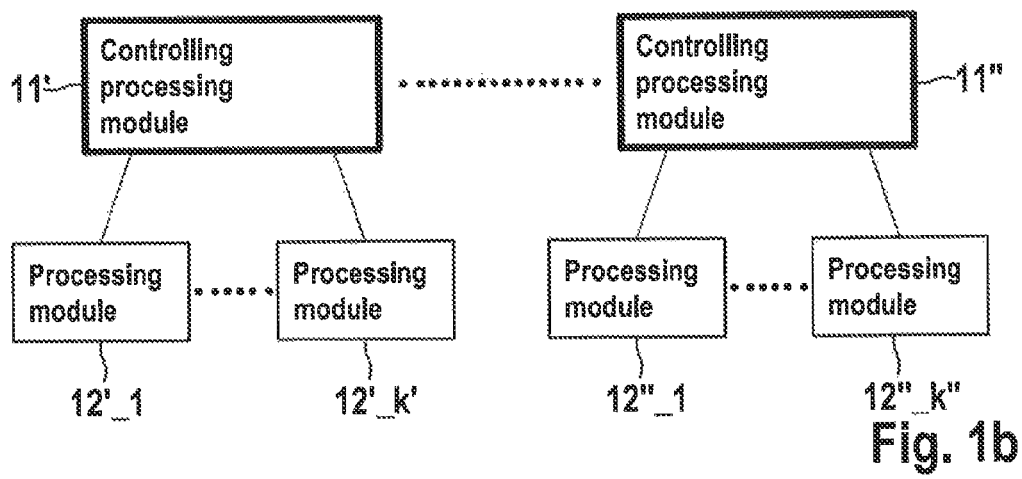
FIG. 1b shows a set of processing modules configured according to an embodiment of the present invention.

FIG. 1b shows a set of processing modules 11' to 11", 12'_1 to 12'_k', 12"_1 to 12"_k" configured according to a further embodiment of the present invention. In FIG. 1b, a set of controlling processing modules 11' to 11" is provided, wherein to each of the controlling processing module 11' to 11" a corresponding subset of further processing modules is assigned 12'_1 to 12'_k', 12"_1 to 12"_k". One controlling processing module 11' of the set of controlling processing module 11' to 11" represents the main controlling processing module. The other controlling processing modules 11" are configured to be selected by the main controlling processing module 11' for executing a corresponding set of parallel executable steps. The main controlling processing module 11' performs the selection with regard to each of the controlling processing modules 11' to 11" and with regard to processing modules 12'_1 to 12'_k' allocated to it. If the main controlling processing module 11' selects also another controlling processing module 11" for executing a set of steps and commands the another controlling processing module 11" to perform said set of steps, the selected processing module 11" is configured to select corresponding processing modules 11", 12"_1 to 12"_k" for executing the set of steps and to command the selected processing modules 11", 12"_1 to 12"_k" to perform the corresponding parallel executable steps as outlined already above with regard to FIG. 1a.

Figure 2:
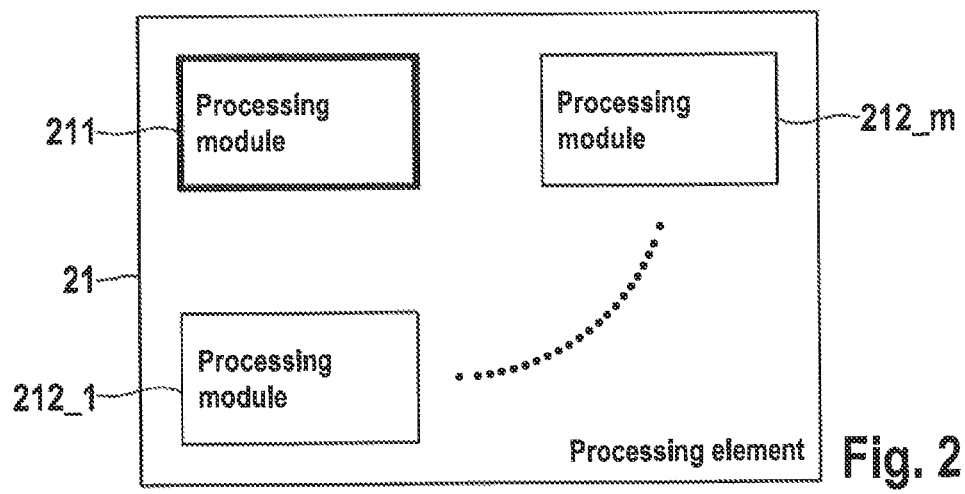
FIG. 2 shows a processing element comprising a set of processing modules and configured according to an embodiment of the present invention.

FIG. 2 shows a processing element 21 comprising a set of processing modules 211, 212_1 to 212-m according to an embodiment of the present invention. The processing element 21 is a processor or a chip like a cell processor or cell chip, for example, which is generally known by the skilled person and, therefore, is not defined explicitly here. The set of processing modules 211, 212_1 to 212-m is implemented as a controller and arranged as outlined above (see particularly FIG. 1 and its description) and/or as explained in more detail below.

Figure 3:
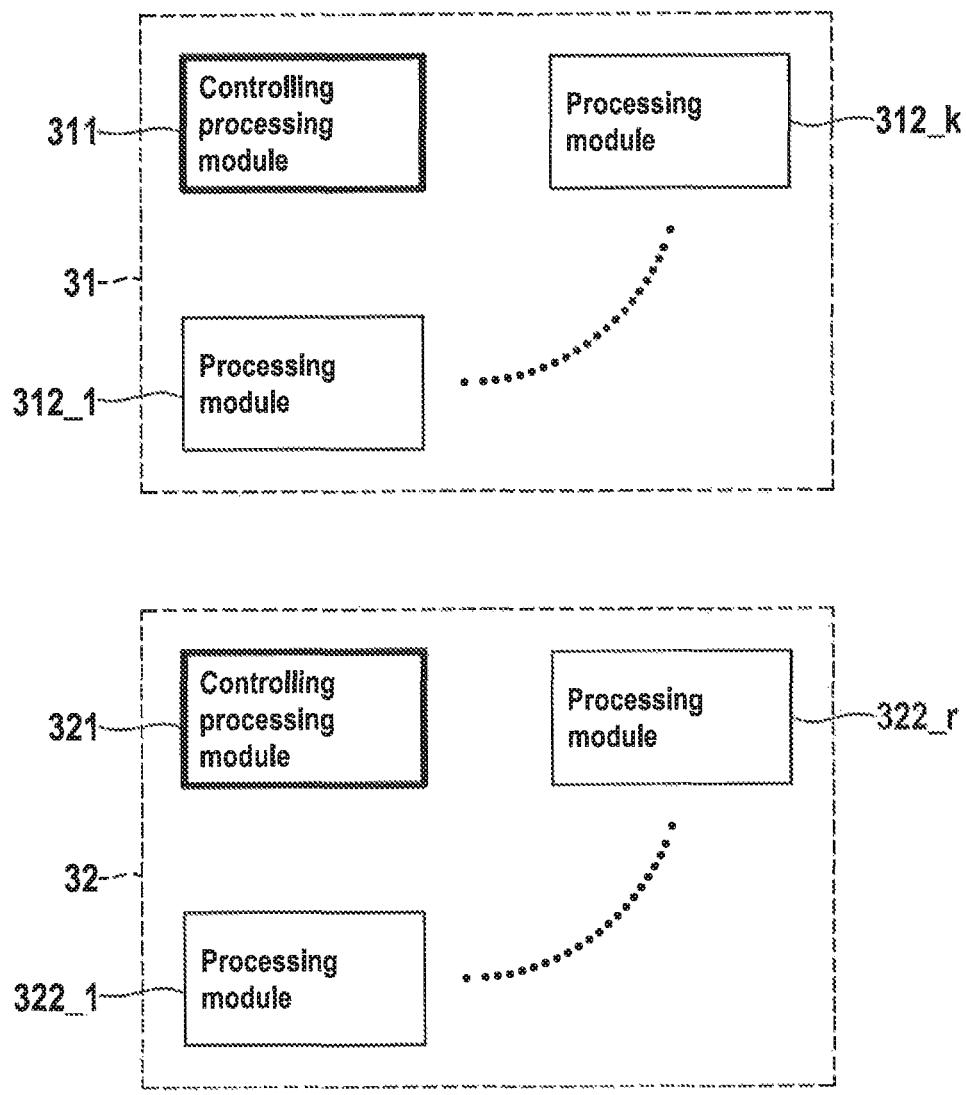
FIG. 3 shows two processing elements according to an embodiment of the present invention, on which a set of processing modules is arranged.

FIG. 3 shows two processing elements 31, 32 according to an embodiment of the present invention, on which a set of processing modules 311, 312_1 to 312_k, 321, 322_1 to 322_r is arranged. According to the present embodiment, each of the processing elements 31, 32 comprises at least one controlling processing module 311, 321 and at least one further processing modules 312_1 to 312_k, 322_1 to 322 . . . r. The account of the further processing modules 312_1 to 312_k, 322_1 to 322_r of each of the processing elements 31, 32 may be different or equal, i.e. r=k or r≠k. Similarly, also the account of the controlling processing modules 311, 321 of each of the processing elements 31, 32 may be different or equal. At least one of the processing elements 31, 32 may be for example a processor or a chip like a cell processor or cell chip, for example. The set of processing modules 311, 312_1 to 312_k, 321, 322_1 to 322_r is implemented and arranged as outlined above (see particularly FIG. 1 and its description) and/or as explained in more detail below.

Figure 4:
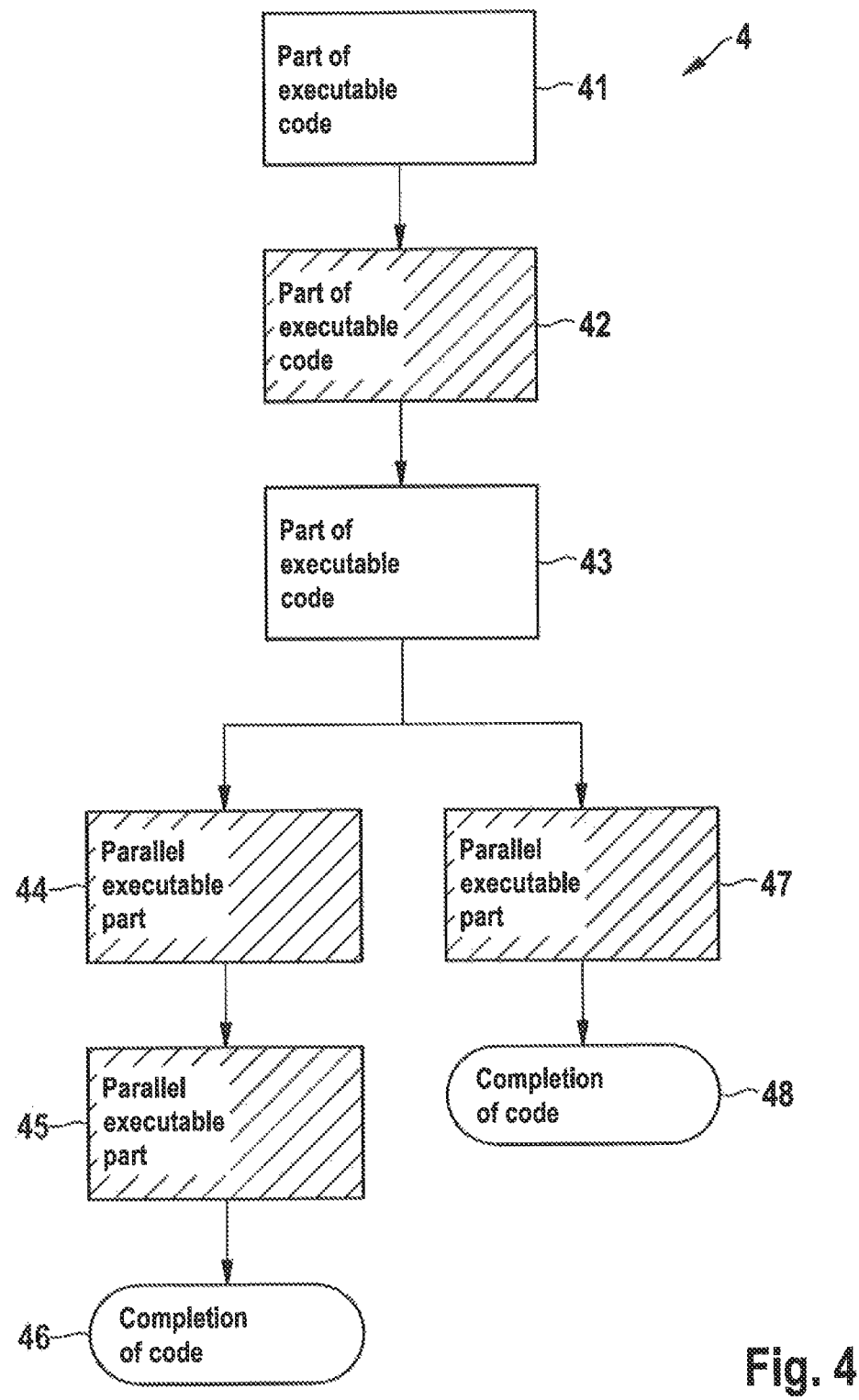
FIG. 4 shows an exemplary structure of an executable code according to an embodiment of the present invention.

FIG. 4 shows an exemplary structure of an executable code 4 according to an embodiment of the present invention. In general, an executable code 4 comprises at least one part that might be executed in parallel, i.e. is parallel executable. The present embodiment shows just an example of partitioning an executable code 4, and the present invention is not restricted to this example only. According to the present embodiment, the executable code is by example partitioned into six parts 41 to 45 and 47, wherein parts 42, 44, 45 and 47 are parallel executable parts. According to the present embodiment, the code 4 has two branches that are executed alternatively. The first branch comprises parts 44 and 45, and after its execution the executable code is completed, see box 46 indicating the completion of the code 4. The second branch comprises the part 47, and after its execution the executable code is completed, see box 48 indicating the completion of the code 4.

Figure 6:
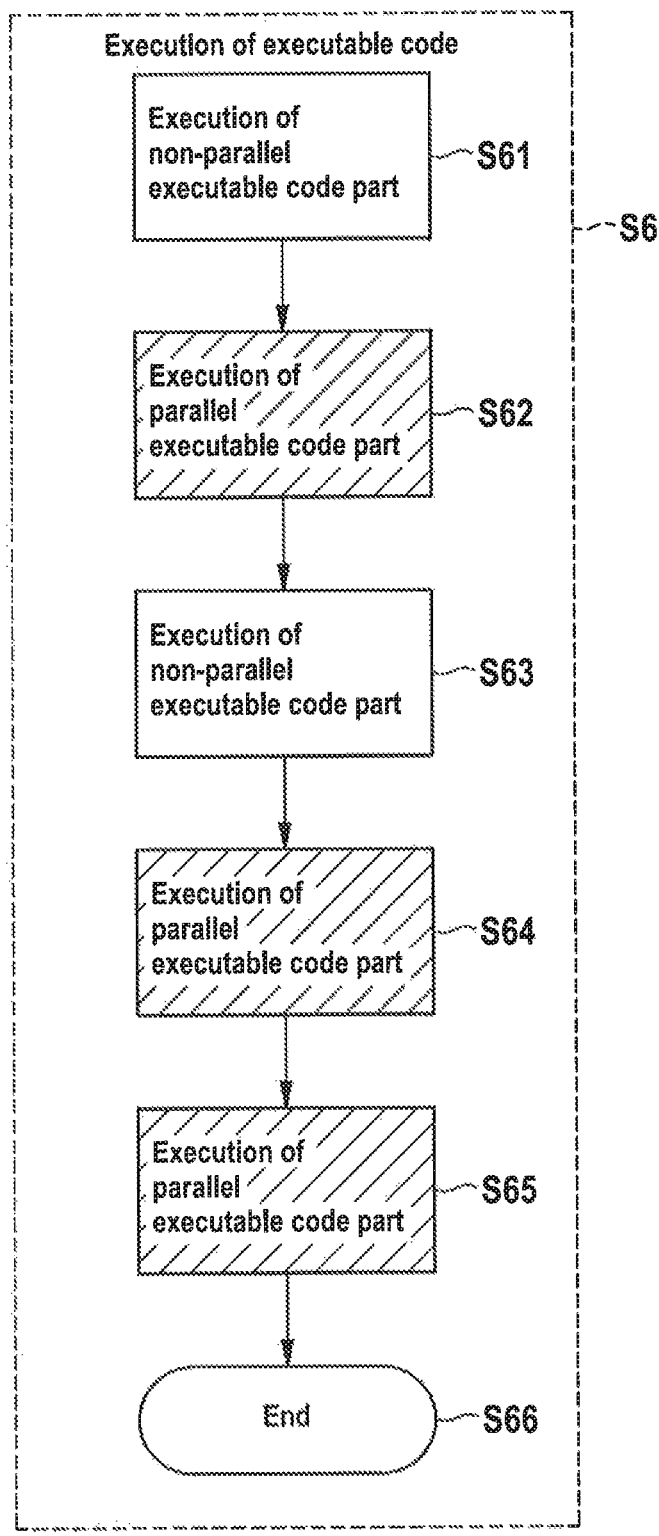
FIG. 6 shows executing an executable code according to an embodiment of the present invention.

FIG. 6 shows exemplary the steps for executing the executable code 4, particularly, the executing when the first alternative with parts 44, 45 is performed.

With regard to the present embodiment, when the code 4 is executed, in step S61 of FIG. 6, the at least one controlling processing module 11, 11' to 11", 211, 311, 321 executes the part 41. The part 41 does not belong to the set of parallel executable parts. Then, after finishing the execution S61 of the part 41, in step S62 of FIG. 6, the at least one controlling processing module 11, 11' to 11", 211, 311, 321 detects or recognizes the parallel executable part 42 as a part of the code 4 to be executed next and selects at least two processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r for performing the detected parallel executable part 42. Further, after selecting, the at least one controlling processing module 11, 11' to 11", 211, 311, 321 commands the selected at least two processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r to perform the part 42. When performing the commanding, the at least one controlling processing module 11, 11' to 11", 211, 311, 321 allocates each parallel executable step of the part 42 to a corresponding selected processing module 11, 11' to 11", 12_1 to 12_k, 12'_1 to 12'_k', 12"_to 12"_k", 211, 212_1 to 212_m, 311, 312_1 to 312_k, 321, 322_1 to 322_r, which, in turn, may be commanded to perform one or more of the parallel executable steps subsequently or substantially in parallel.

Further, in step S62 of FIG. 6, after finishing the execution of the steps of part 42, each of the corresponding selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r provides the results or feedback of the execution to the at least one controlling processing module 11, 11' to 11", 211, 311, 321. After receiving the results or feedback of the execution of all parallel executable steps of the part 42, the at least one controlling processing module 11, 11' to 11", 211, 311, 321 considers the part 42 as being executed. Thus, the step S62 of FIG. 6 is completed.

In step S63 of FIG. 6, the at least one controlling processing module 11, 11' to 11", 211, 311, 321 executes the next part 43, since according to the present embodiment the part 43 does not belong to the set of parallel executable parts.

After completing the execution S63 of the part 43, the at least one controlling processing module 11, 11' to 11", 211, 311, 321 determines, which of the further alternatives comprising parts 44 and 45 or part 47 has to be executed according to the given situation. If parts 44 and 45 are the alternative to be taken as it is the case in the present embodiment of FIG. 6, in step S64, the at least one controlling processing module 11, 11' to 11", 211, 311, 321 detects the part 44 as a parallel executable part and performs its execution in the same way as explained above with regard to the part 42.

After executing S64 the part 44, in step S65 of FIG. 6, the at least one controlling processing module 11, 11' to 11", 211, 311, 321 detects the part 45 as a parallel executable part and performs its execution in the same way as explained above with regard to the part 42. When the execution S65 of the part 44 is finished, the execution of the code 4 ends in step S66, e.g. no further code instructions to be executed are available, and the at least one controlling processing module 11, 11' to 11", 211, 311, 321 completes the execution of the code 4 as indicated by the box 46 in FIG. 4 and by the step S66 in FIG. 6.

A similar proceeding is done also with regard to the second alternative comprising the parallel executable part 47 only. After the execution of the part 47 as explained above with regard to part 42, the at least one controlling processing module 11, 11' to 11", 211, 311, 321 completes the execution of the code 4 as indicated by the box 48 in FIG. 4.

FIGS. 5a to 5d show examples of executing parallel executable parts 42, 44, 45, 47. The execution of parallel executable parts 42, 44, 45, 47 depends on the type of parallelization, which, according to an embodiment of the present invention, might be a type referring to program loops or a type referring to conditional branches.

Program loops are generally known in the area of software programming. A loop is a sequence of instructions which is specified once but which is carried out several times in succession. The sequence of instructions specified within the loop and performed with regard to the loop is referred also to as the body of the loop. Additionally, the loop comprises a specification of number of times for executing the instructions of the body of the loop. Typical representatives for loops are, for example, the for-loop or the while-loop.

The for-loop may be specified as follows:
For j=1 TO N
    XXX

The statement "For j=1 TO N" specifies the number of iterations, in the present example N, for executing the instructions "XXX" of the body of the if-loop.

The while-loop may be specified as follows:
Do while (test)
    XXX

The statement "Do while (test)" specifies the number of iterations for executing the instructions "XXX" of the body of the while-loop. The statement "test" represents a condition that has to be true every time the while-loop is executed.

The above provided loops are just examples, and the present invention is not restricted to them and allows the use also of further loop specifications.

According to an embodiment of the present invention, a parallel executable part may be defined by one loop only. Each parallel executable step of such a parallel executable part refers to a particular time, i.e. cycle, in which the body of the loop is performed, and is allocated to a corresponding selected processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r for execution of said parallel executable step. A selected processing module 11, 11' to 11", 12_1 to 12_k, 12'_1 to 12'_k', 12"_1 to 12"_k", 211, 212_1 to 212_m, 311, 3121 to 312_k, 321, 322_1 to 322_r performs at least one cycle or parallel executable step of the loop and may perform also more than one parallel executable step or cycle.

The condition for using one loop as a parallel executable block is independent execution of each cycle of the loop. I.e. the execution of one cycle of the loop does not influence the execution of anyone of the other cycles of the loop.

Figure 5A:
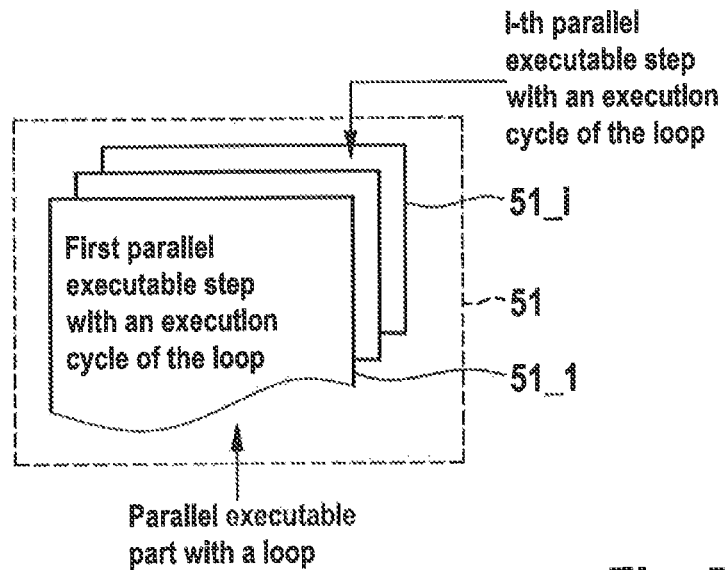
FIG. 5a shows a parallel executable part of an executable code according to an embodiment of the present invention.
Figure 8A:
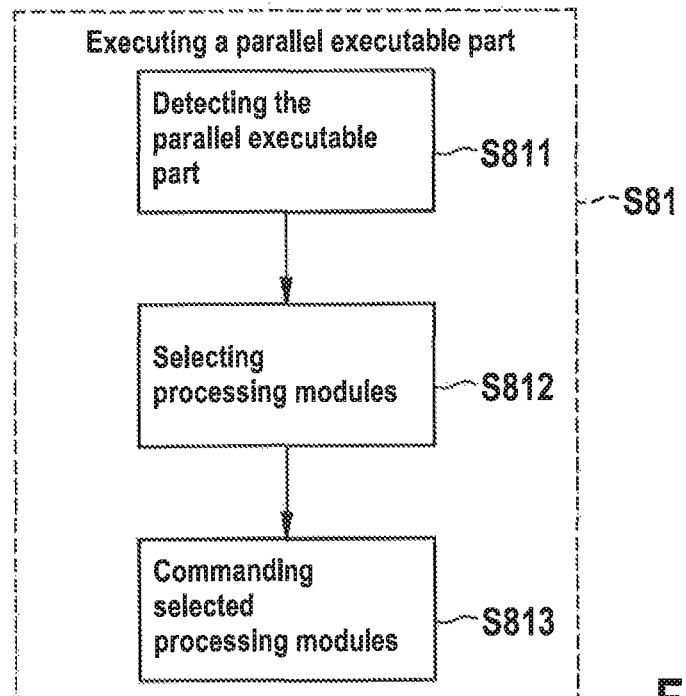
FIG. 8a shows steps for executing a parallel executable part of an executable code according to an embodiment of the present invention.

FIG. 5a shows an example for a parallel executable part 51, which comprises one loop and each parallel executable step 51_1 to 51_i of which represents an execution cycle of the loop. FIG. 8a shows steps for executing S81 the parallel executable part 51 of FIG. 5a. In step S811 of FIG. 8a, the at least one controlling processing module 11, 11' to 11", 211, 311, 321 detects the part 51 of the executable code as being the part to be executed next. In step S812 of FIG. 8a, the at least one controlling processing module 11, 11' to 11", 211, 311, 321 selects at least two processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r for performing the part 51 of the executable code. The selection may depend on the account of parallel executable steps/cycles 51_1 to 51_i necessary to perform the loop or part 51 respectively. The amount of parallel executable steps/cycles 51_1 to 51_is distributed among the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r. To this, in step S813 of FIG. 8a, the at least one controlling processing module 11, 11' to 11", 211, 311, 321 allocates each parallel executable step/cycle 51_1 to 51_i of the loop/part 51 to a corresponding selected processing module 11, 11' to 11", 121 to 12_k, 12'_1 to 12'_k', 12"_1 to 12"_k", 211, 212_1 to 212_m, 311, 3121 to 312_k, 321, 322_1 to 322_r that may perform one or more than one of the parallel executable steps/cycles 51_1 to 51_i and commands the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r to perform the parallel executable one or more steps/cycles 51_1 to 51_i allocated to them.

According to an embodiment of the present invention, a parallel executable part may be defined by a plurality of loops, i.e. more than one loop. The condition for such a parallel executable part is the independent execution of the loops of the parallel executable part. Thus, the executing of each loop does not influence the executing of anyone of other loops, i.e. none of the loops uses or requires data that has been changed by another one. According to this embodiment, each of the loops is considered as a parallel executable step of the parallel executable part comprising the plurality of loops.

Figure 5B:
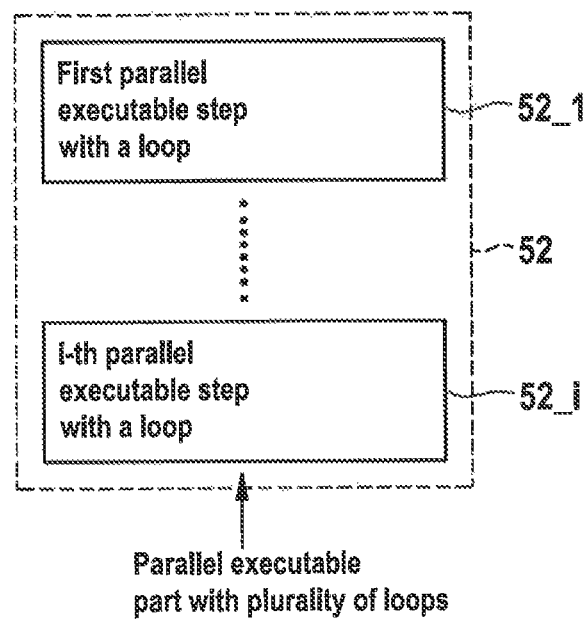
FIG. 5b shows a parallel executable part of an executable code according to an embodiment of the present invention.
Figure 8B:
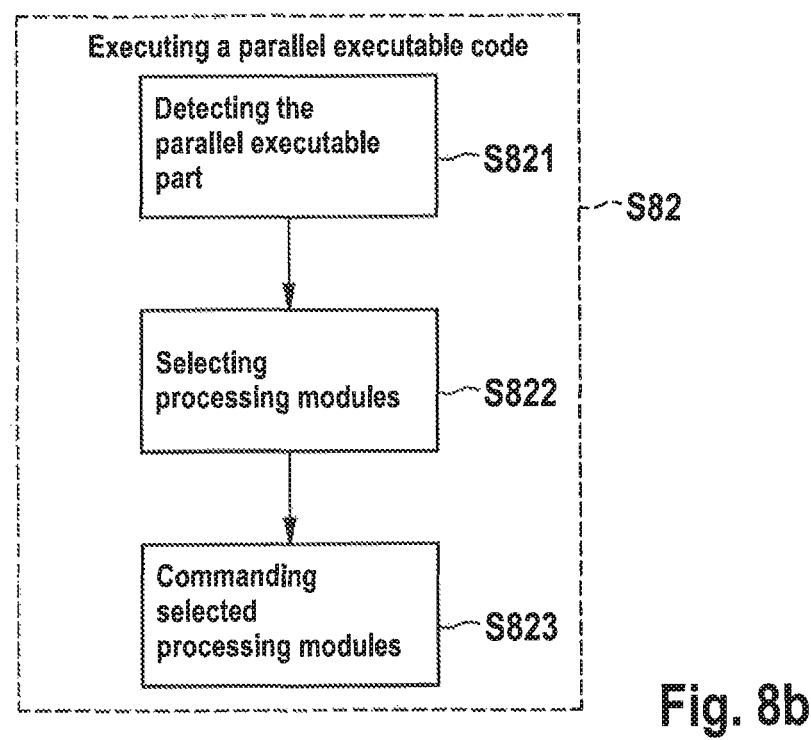
FIG. 8b shows steps for executing a parallel executable part of an executable code according to an embodiment of the present invention.

FIG. 5b shows an example for a parallel executable part 52, which comprises a plurality of loops, each of the loops representing a parallel executable step 52_1 to 52_i of the parallel executable part 52. FIG. 8b shows steps for executing S82 the parallel executable part 52 of FIG. 5b. In step S821 of FIG. 8b, the at least one controlling processing module 11, 11' to 11", 211, 311, 321 detects the part 52 of the executable code as being the part to be executed next. In step S822 of FIG. 8b, the at least one controlling processing module 11, 11' to 11", 211, 311, 321 selects at least two processing modules 11, 11' to 11", 121 to 12_k, 12'_1 to 12'_k', 12"_1 to 12"_k", 211, 212_1 to 212_m, 311, 312_1 to 312_k, 321, 322_1 to 322_r for performing the part 52 of the executable code. The selection may depend on the account of parallel executable steps/loops 52_1 to 52_i comprised in the part 52. The parallel executable steps/loops 52_1 to 52_i of the part 52 are distributed among the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r. To this, in step S823 of FIG. 8b, the at least one controlling processing module 11, 11' to 11", 211, 311, 321 allocates each parallel executable step/loop 52_1 to 52_i of the part 52 to a corresponding selected processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r that may perform one or more than one of the parallel executable steps/loops 52 and commands the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r to perform the parallel executable one or more steps/loops 52_1 to 52_i allocated to them.

According to an embodiment of the present invention, a parallel executable part may be of type that refers to conditional branches. Conditional branches are generally known in the area of software programming. A conditional branch comprises a sequence of statements/instructions in an executable code 4 that is conditionally executed and a condition that specifies the one or more cases, in which the statements/instructions of the conditional branch are to be executed. The statements/instructions may be referred to as body of the conditional branch. Typical examples for conditional branches are if-then-else constructs. An if-then-else construct may be defined as follows:

```
if (condition 1) then
    yyy1
else if (condition 2) then
    yyy2
else
    yyy3
```

The statements "if (condition 1)", "else if (condition 2)" and "else" specify the conditions, wherein "else" refers to the case, in which "condition 1" and "condition 2" are not met. "yyy1", "yyy2", "yyy3" specify the bodies of the corresponding conditions to be performed when the conditions are met.

Figure 5C:
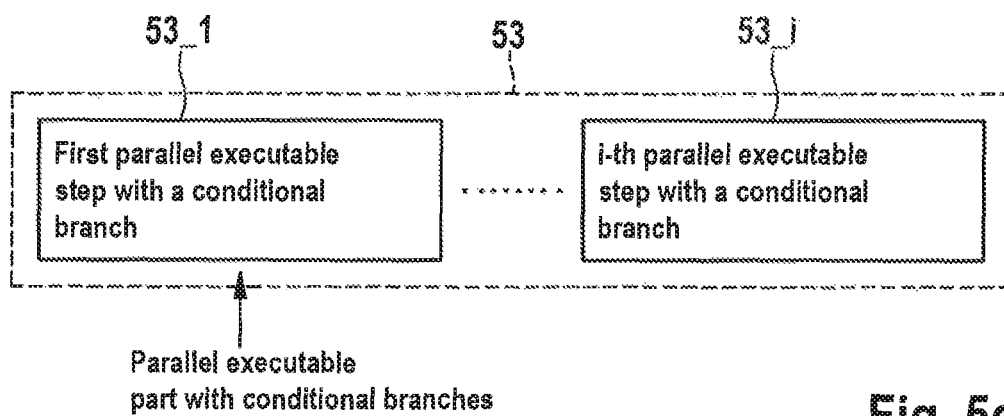
FIG. 5c shows a parallel executable part of an executable code according to an embodiment of the present invention.

FIG. 5c shows a parallel executable part 53 of an executable code according to an embodiment of the present invention. According to the embodiment of FIG. 5c, the parallel executable part 53 comprises conditional branches, wherein each conditional branch with its condition specification and with the corresponding body of the condition represents a parallel executable step 53_1 to 53_i of the parallel executable part 53.

Figure 8C:
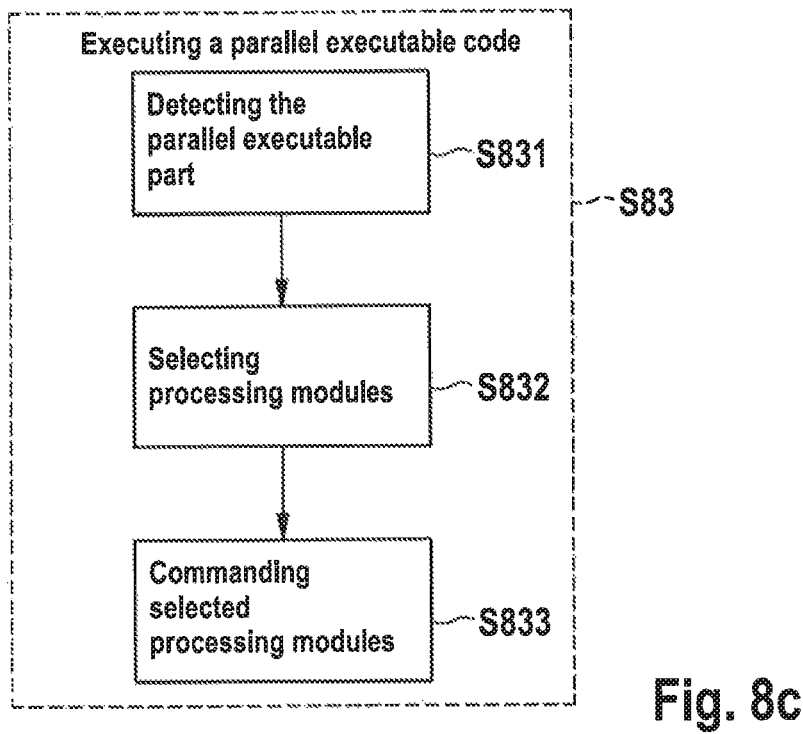
FIG. 8c shows steps for executing a parallel executable part of an executable code according to an embodiment of the present invention.

FIG. 8c shows steps for executing S83 the parallel executable part 53 of FIG. 5c. In step S831 of FIG. 8c, the at least one controlling processing module 11, 11' to 11", 211, 311, 321 detects the part 53 of the executable code as being the part to be executed next. In step S832 of FIG. 8c, the at least one controlling processing module 11, 11' to 11", 211, 311, 321 selects at least two processing modules 11, 11' to 11", 12_1 to 12_k, 12'_1 to 12'_k', 12"_1 to 12"_k" 211, 212_1 to 212_m, 311, 312_1 to 312_k, 321, 322_1 to 322_r for performing the part 53 of the executable code. The selection may depend on the account of parallel executable steps/conditional branches 53_1 to 53_i comprised in the part 53. The parallel executable steps/conditional branches 53_1 to 53_i of the part 53 are distributed among the selected processing modules 11, 11' to 11", 121 to 12_k, 12'_1 to 12'_k', 12"_1 to 12"_k", 211, 212_1 to 212_m, 311, 312_1 to 312_k, 321, 322_1 to 322_r. To this, in step S833 of FIG. 8c, the at least one controlling processing module 11, 11' to 11", 211, 311, 321 allocates each parallel executable step/conditional branch 53_1 to 53_i of the part 53 to a corresponding selected processing module 11, 11' to 11", 121 to 12_k, 12'_1 to 12'_k', 12"_1 to 12"_k", 211, 212_1 to 212_m, 311, 312_1 to 312_k, 321, 322_1 to 322_r that may perform one or more than one of the parallel executable steps/branches 53_1 to 53_i and commands the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r to perform the one or more parallel executable steps/branches 53_1 to 53_i allocated to them.

Figure 5D:
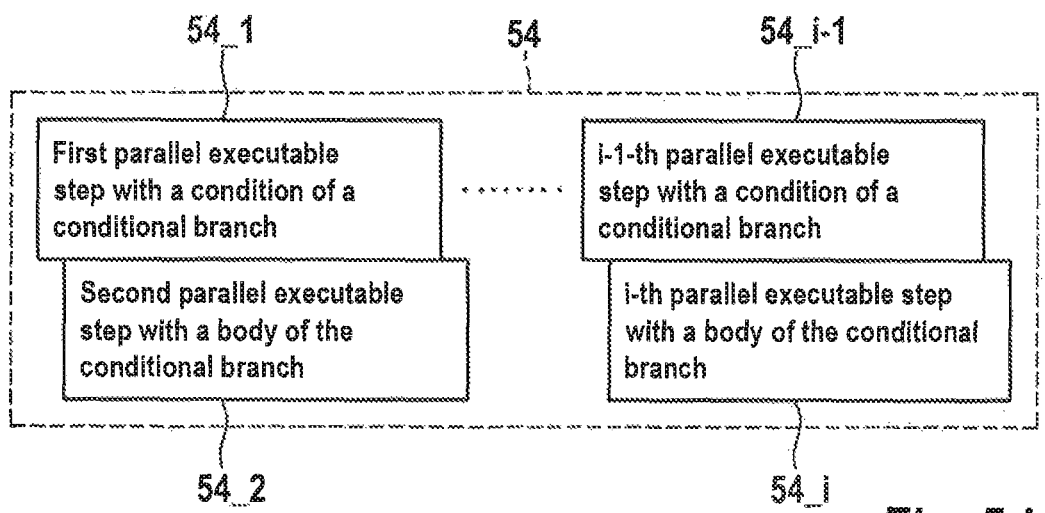
FIG. 5d shows a parallel executable part of an executable code according to an embodiment of the present invention.

FIG. 5d shows a parallel executable part 54 of an executable code according to an embodiment of the present invention. According to the embodiment of FIG. 5d, the parallel executable part 54 comprises conditional branches, wherein each condition specification and each body of a condition represents a parallel executable step 54_1 to 54_i of the parallel executable part 54. For better understanding, in FIG. 5d the parallel executable steps represented by conditions 54_1, 54_i–1 are drawn above their bodies 54_2, 54_i.

Figure 8D:
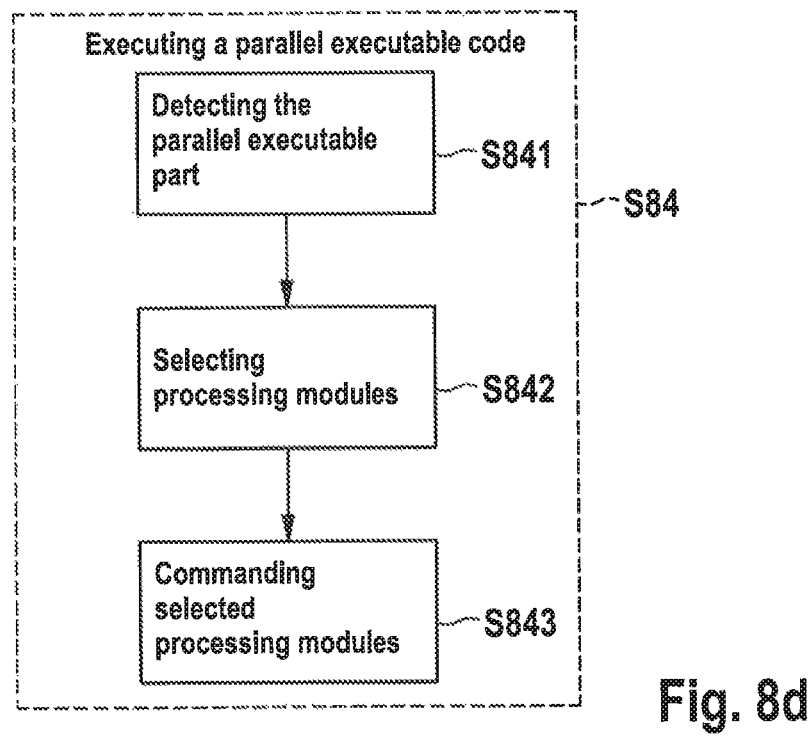
FIG. 8d shows steps for executing a parallel executable part of an executable code according to an embodiment of the present invention.

FIG. 8d shows steps for executing S84 the parallel executable part 54 of FIG. 5d. In step S841 of FIG. 8d, the at least one controlling processing module 11, 11' to 11", 211, 311, 321 detects the part 54 of the executable code as being the part to be executed next. In step S842 of FIG. 8d, the at least one controlling processing module 11, 11' to 11", 211, 311, 321 selects at least two processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r for performing the part 54 of the executable code. The selection may depend on the account of the parallel executable steps 54_1 to 54_i of the part 54. The parallel executable steps 54_1 to 54_i of the part 54 are distributed among the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r. To this, in step S843 of FIG. 8d, the at least one controlling processing module 11, 11' to 11", 211, 311, 321 allocates each parallel executable step 54_1 to 54_i of the part 54 to a corresponding selected processing module 11, 11' to 11", 121 to 12_k, 12'_1 to 12'_k', 12"_1 to 12"_k", 211, 212_1 to 212_m, 311, 312_1 to 312_k, 321, 322_1 to 322_r that may perform one or more than one of the parallel executable steps 54_1 to 54_i and commands the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r to perform the one or more parallel executable steps 54_1 to 54_i allocated to them.

Here, it has to be noted that a parallel executable part may comprise at least one further parallel executable part, i.e. at least one parallel executable sub-part. In this case, when the parallel executable part is performed by selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r and when within this execution a parallel executable sub-part is detected, the steps of selecting and commanding as described above are executed again with regard to the parallel executable sub-part. When performing the selecting of processing modules 11, 11' to 11", 121 to 12_k, 12'1 to 12'_k', 12"_1 to 12"_k", 211, 212_1 to 212_m, 311, 312_1 to 312_k, 321, 322_1 to 322_r, another processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r different from those selected for said parallel executable part is selected with regard to the performing of the parallel executable sub-part.

Figure 7:
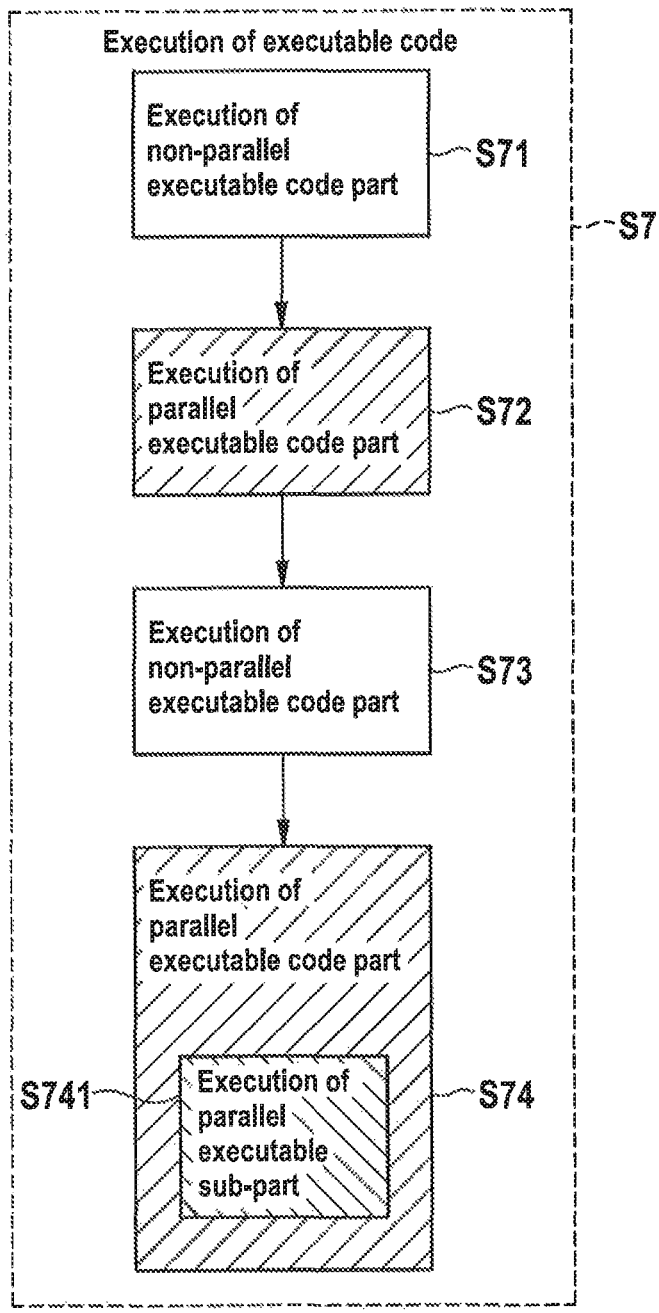
FIG. 7 shows performing an executable code according to an embodiment of the present invention.

FIG. 7 shows performing S7 an executable code according to an embodiment of the present invention, where, during an execution S74 of a parallel executable part, a parallel executable sub-part is performed S741. According to FIG. 7, at first, a part of the executable code is executed S71 by the at least one controlling processing module 11, 11' to 11", 211, 311, 321. Then, a parallel executable part is executed S72 by at least two processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r selected by the at least one controlling processing module 11, 11' to 11", 211, 311, 321. Subsequently, a further part is executed S73 by the at least one controlling processing module 11, 11' to 11", 211, 311, 321. In step S74, an execution of a parallel executable part is done. Here, the corresponding selected processing module 11, 11' to 11", 121 to 12_k, 12'_1 to 12'_k', 12"_1 to 12"_k", 211, 212_1 to 212_m, 311, 312_1 to 312_k, 321, 322_1 to 322_r detects the presence of the parallel executable sub-part and reports this to the at least one controlling processing module 11, 11' to 11", 211, 311, 321. In step S741, by receiving the report, the at least one controlling processing module 11, 11' to 11", 211, 311, 321 detects the presence of the parallel executable sub-part. Then, in step S741, the at least one controlling processing module 11, 11' to 11", 211, 311, 321 selects at least two processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r for performing said sub-part and commands them to perform the corresponding parallel executable steps of the parallel executable sub-part. After the execution of the step S741, the execution of the step S74 is continued by the corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r that was selected with regard to the parallel executable part comprising said sub-part.

Figure 9A:
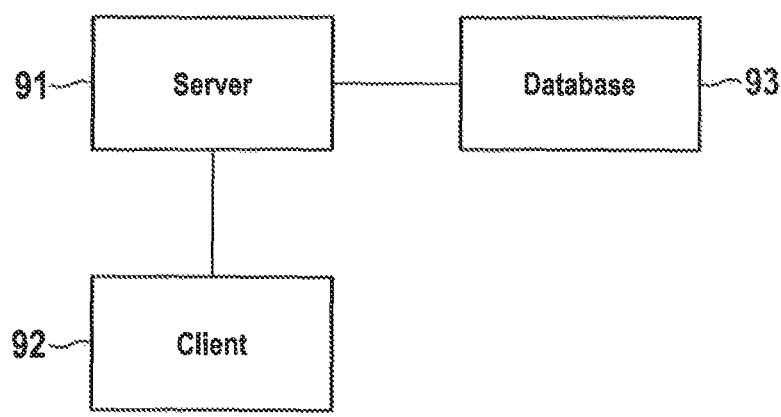
FIG. 9a shows a system, in which the present invention is implemented according to an embodiment of the present invention.

FIG. 9a shows a system, in which the present invention may be implemented according to an embodiment of the present invention. The system of FIG. 9a comprises a server 91, a client 92 and a data base 93. According to the present embodiment, the client 92 transmits service and/or data requests to the server 91. The server 91 processes each of the received service and/or data requests. To this, the server 91 may retrieve corresponding or necessary data at least partially by use of the data base 93. The server 91 and the data base 93 are configured to exchange data among each other. After processing each of the received service and/or data requests, the server 91 transmits corresponding data or information to the client 92 in response to the corresponding request of the client 92. The server 92 may be, for example, a web server or another information or service providing server such as application servers.

Figure 9B:
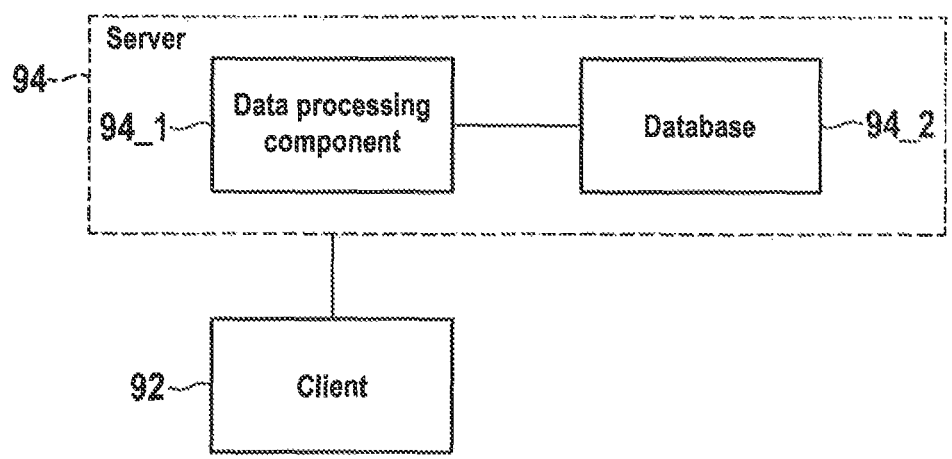
FIG. 9b shows a system, in which the present invention is implemented according to an embodiment of the present invention.

FIG. 9b shows a system, in which the present invention may be implemented according to a further embodiment of the present invention. The system of FIG. 9a comprises a client 92 and a server 94, wherein the server 94 comprises a data processing component 94_1 and a data base 94_2. According to the present embodiment, the client 92 transmits data and/or service requests to the server 94. In response to each request received from the client 92, the data processing component 94_1 of the server 94 processes the corresponding request. To this, the data processing component 94_1 may retrieve corresponding or necessary data at least partially by use of the data base 94_2. The data processing component 94_1 and the data base 94_2 are configured to exchange data among each other. After processing each of the received service and/or data requests, the server 94 transmits corresponding data or information to the client 92 in response to the corresponding request of the client 92. The server 94 may be, for example, a web server or another information or service providing server.

Figure 10:
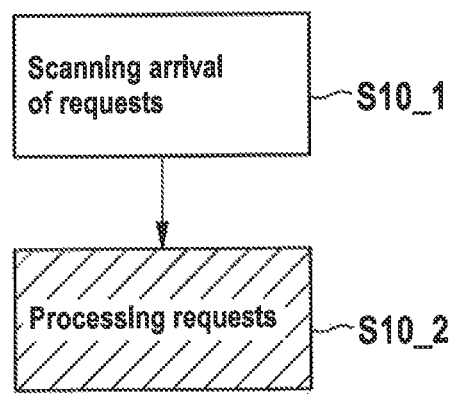
FIG. 10 shows a method for executing an executable code according to an embodiment of the present invention.

FIG. 10 shows a method for executing an executable code according to an embodiment of the present invention. According to the present embodiment, the executable code refers to or comprises a software program or system that provides requested data. When taking into account the embodiments of FIG. 9a and FIG. 9b, the executable code is executed by the server 91, 94. Thus, the server 91, 94 is the component that has to be able to handle with large amounts of data that refer to at least one of following: large amounts of received requests, processing of large amounts of data, e.g. data stored in the data base 93, 94_2, data arising during processing and/or providing large amounts of data to the client 92 in response to a request received from the client 92. The server 91, 94 is configured to serve not only one but also a plurality of clients 92, as it is usual for a web server, for example.

In following, the present embodiment will handle the case where the server 91, 94 is a web server. However, the present invention is not restricted to the web server application only. The same scenario may be applied similarly also with regard to further kinds of servers 91, 94.

According to the present embodiment, in step S10_1, the server 91, 94 scans arrival of requests from clients 92. The step S10_1 is performed by at least one controlling processing module 11, 11' to 11", 211, 311, 321 of the server 91, 94 or the data processing component 94_1.

In step S10_2, the processing of the received requests is performed. Each of the received requests are processed S10_2 substantially in parallel to another received request. Therefore, the part of the executable code referring to the processing of the received requests represents a parallel executable part that comprises a program loop. This parallel executable part is executed as indicated in FIGS. 5a and 8a. After detecting the presence of the one or more requests, for each of the received requests, the at least one controlling processing module 11, 11' to 11", 211, 311, 321 selects a corresponding processing module 11, 11' to 11", 12_1 to 12_k, 12'_1 to 12'_k', 12" 1 to 12"_k" 211, 212_1 to 212_m, 311, 312_1 to 312_k, 321, 322_1 to 322_r of the server 91, 94 or the data processing component 94_1 and commands it to perform the processing of the request.

Figure 11:
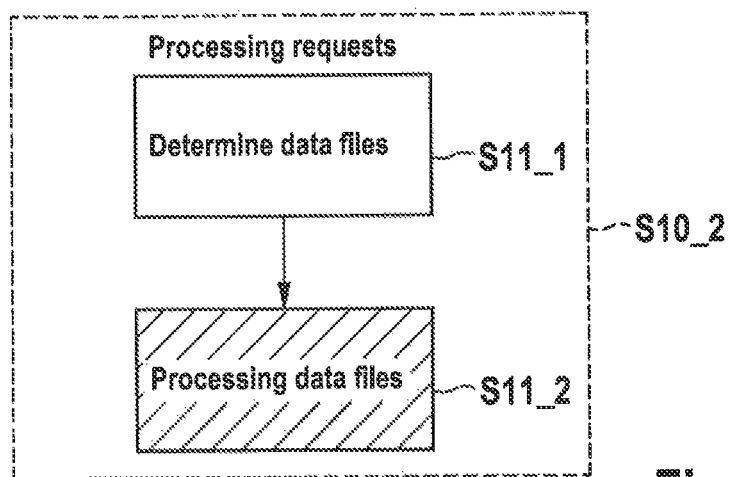
FIG. 11 shows performing a step of processing requests of said method according to the embodiment of the present invention.

FIG. 11 shows the performing of the step of processing requests S10_2 according to the present embodiment in more detail. According to the present embodiment, the request received from the client 92 comprises a uniform resource locator (URL) that represents a web address. In step S11_1, the corresponding processing module 11, 11' to 11", 12_1 to 12_k, 12'_1 to 12'_k', 12" 1 to 12"_k", 211, 212_1 to 212_m, 311, 312_1 to 312_k, 321, 322_1 to 322_r selected for processing a request determines the data to which the request refers, e.g. that is visualized or represented when the URL of the request is accessed. According to the present embodiment, the determined data corresponds to at least one data file that might be stored in the data base 93, 94_2.

In step S11_2, each data file that has been determined as being used for visualization of said URL of the request is processed. Since a plurality of data files will be present, the part coding the step S11_2 represents a parallel executable part that refers to a program loop performed with regard to each of the data files. The execution of this parallel executable part is done as indicated in FIGS. 5a and 8a, for example. Thus, the corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r that is selected to perform the step S102 with regard to a particular request informs the at least one controlling processing module 11, 11' to 11", 211, 311, 321 on presence of the parallel executable part. Via receiving the information, the at least one controlling processing module 11, 11' to 11", 211, 311, 321 detects the presence of said parallel executable part, selects for each of the data files a corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r and commands the corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r to perform a processing S11_2 of said data file.

Figure 12:
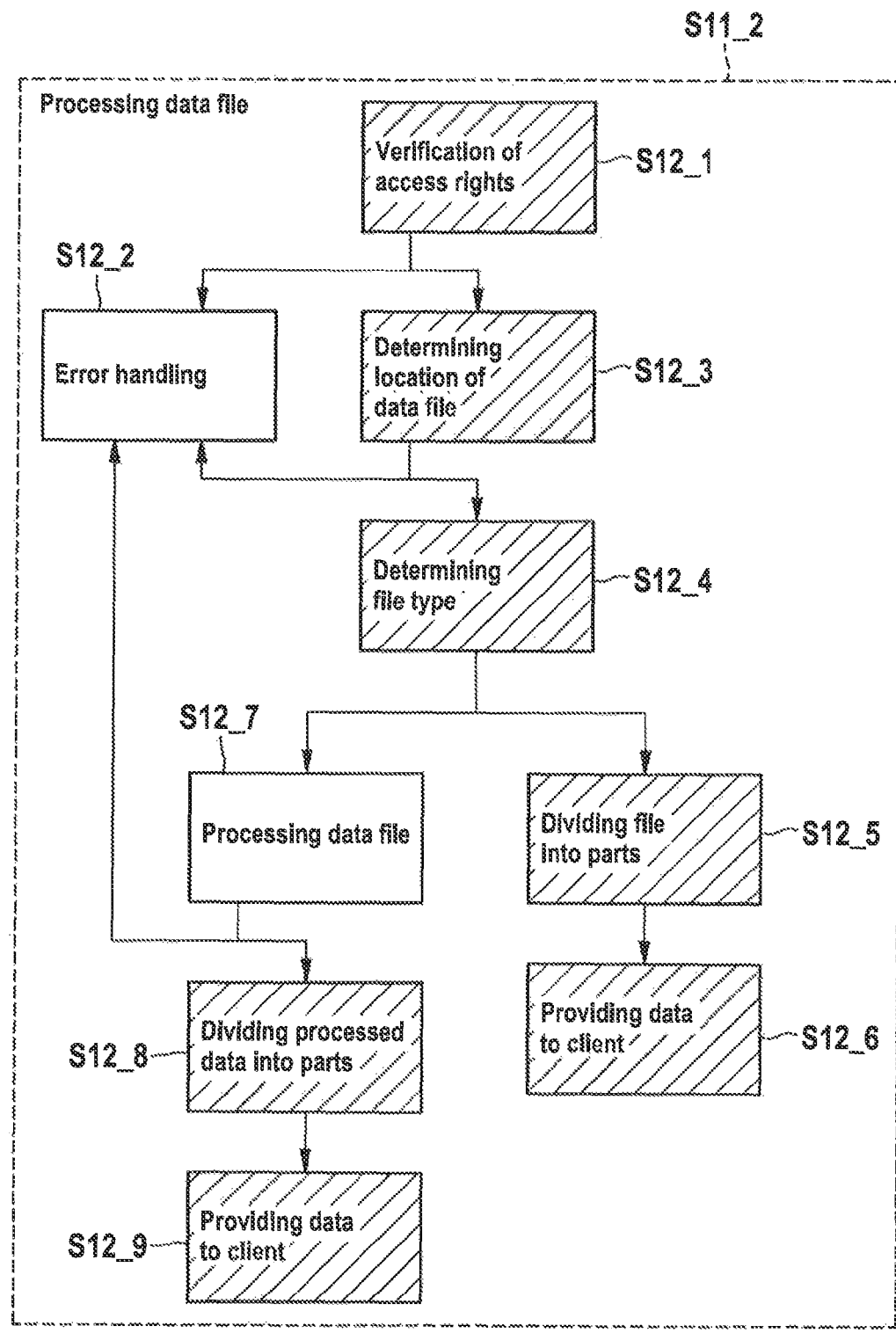
FIG. 12 shows performing a step of processing a file of said method according to the embodiment of the present invention.

FIG. 12 shows the performing of the processing S11_2 of a file according to the present embodiment in more detail. In step S12_1, the verification of access rights is done. Since a plurality of access rights may be checked, the part of the executable program that codes the step S12_1 is a parallel executable part that comprises conditional branches. The execution of this parallel executable part is done as indicated in FIGS. 5c and 8c or as indicated in FIGS. 5d and 8d. The corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r selected to perform the step S11_2 informs the at least one controlling processing module 11, 11' to 11", 211, 311, 321 on presence of the parallel executable part. Via receiving the information, the at least one controlling processing module 11, 11' to 11", 211, 311, 321 detects the presence of said parallel executable part and selects corresponding processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r for performing the verification of access rights. Each of the parallel executable steps may comprise a whole conditional branch (see the situation of FIGS. 5c and 8c) or may comprise a condition specification or a body of a condition branch (see the situation of FIGS. 5d and 8d). A condition specification may represent checking a particular access right, and the body of a condition branch may specify the steps to be performed when the corresponding condition is true. The at least one controlling processing module 11, 11' to 11", 211, 311, 321 commands the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r to perform the corresponding one or more parallel executable steps allocated to them. After receipt of results from each of the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r, the at least one controlling processing module 11, 11' to 11", 211, 311, 321 provides the results to the processing module 11, 11' to 11", 121 to 12_k, 12'_1 to 12'_k', 12"_1 to 12"_k", 211, 212_1 to 212_m, 311, 312_1 to 312_k, 321, 322_1 to 322_r selected to perform the step S11_2.

The corresponding selected processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r verifies whether the access to the data file is permitted. If not, the execution of the error handling step S12_2 is initiated. If the access to the data file is permitted, in step S12_3 the presence of the file is checked. Here, each of possible locations (e.g. in the database 93, 942) for the data file is checked. Therefore, the part of the executable code coding the execution of the step S12_3 is a parallel executable part that comprises conditional branches. The execution of this parallel executable part is done as indicated in FIGS. 5c and 8c or as indicated in FIGS. 5d and 8d. The corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r selected to perform the step S11_2 informs the at least one controlling processing module 11, 11' to 11", 211, 311, 321 on presence of the parallel executable part. Via receiving the information, the at least one controlling processing module 11, 11' to 11", 211, 311, 321 detects the presence of said parallel executable part and selects corresponding processing modules 11, 11' to 11", 121 to 12_k, 12'_1 to 12'_k', 12"_1 to 12"_k", 211, 212_1 to 212_m, 311, 312_1 to 312_k, 321, 322_1 to 322_r. Each of the parallel executable steps may comprise a whole conditional branch (see the situation of FIGS. 5c and 8c) or may comprise a condition specification or a body of a condition branch (see the situation of FIGS. 5d and 8d). A condition specification may represent checking a particular location, and the body of a condition branch may specify the steps to be performed when the corresponding condition is true. The at least one controlling processing module 11, 11' to 11", 211, 311, 321 commands the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r to perform the one or more parallel executable steps allocated to them. After receipt of results from each of the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r, the at least one controlling processing module 11, 11' to 11", 211, 311, 321 provides the results to the processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r selected to perform the step S11_2.

If no location of the data file could be determined in step S123, a corresponding error handling is started in step S12_2. Otherwise, the step S12_4, in which determining of the file type, e.g. Multipurpose Internet Mail Extension (MIME), of the data file is done. Since several file types are possible, the part of the executable code coding the execution of the step S12_2 is a parallel executable part that comprises conditional branches with one branch per file type. The execution of this parallel executable part may be done as indicated in FIGS. 5c and 8c or as indicated in FIGS. 5d and 8d. The corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r selected to perform the step S11_2 informs the at least one controlling processing module 11, 11' to 11", 211, 311, 321 on presence of the parallel executable part. Via receiving the information, the at least one controlling processing module 11, 11' to 11", 211, 311, 321 detects the presence of said parallel executable part and selects corresponding processing modules 11, 11' to 11", 121 to 12_k, 12'_1 to 12'_k', 12"_1 to 12"_k", 211, 212_1 to 212_m, 311, 312_1 to 312_k, 321, 322_1 to 322_r. Each of the parallel executable steps may comprise a whole conditional branch (see the situation of FIGS. 5c and 5c) or may comprise a condition specification or a body of a condition branch (see the situation of FIGS. 5d and 8d). A condition specification may represent checking a particular file type, and the body of a condition branch may specify the steps to be performed when the corresponding condition is true. The at least one controlling processing module 11, 11' to 11", 211, 311, 321 commands the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r to perform the one or more parallel executable steps allocated to them. After receipt of results of the condition checking from each of the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r, the at least one controlling processing module 11, 11' to 11", 211, 311, 321 provides the results to the processing module 11, 11' to 11", 12_1 to 12_k, 12'_1 to 12'_k', 12"_1 to 12"_k" 211, 212_1 to 212_m, 311, 312_1 to 312_k, 321, 322_1 to 322_r selected to perform the step S11_2.

Then, the further processing depends on the type of the data file. If for visualizing the data file of said type no further processing of the corresponding data is necessary, e.g. by use of an interpreter, the data file might be provided to the client 92. In this case, step S12_5 is performed, in which the file is divided into a plurality of parts for transmitting of the file. To this a partial reading of the file is done, wherein parts of equal size are read and processed to data packets for transmitting to the client 92 and wherein the last part read and processed to data packet is smaller or equal to the other/preceding parts. Since the reading and the subsequent generating of data packets with the corresponding data parts are done in parallel, the part of the executable code coding the step S12_5 is a parallel executable part. The parallel executable part coding the step S12_5 comprises a program loop, in which at particular parts of the data file the corresponding data is taken for generating corresponding data packets. The loop is performed as long as the end of the data file is reached. Thus, the execution of the parallel executable part is done as indicated in FIG. 5a and in FIG. 8a. The handling of each part of the data file corresponds to one parallel executable step. The corresponding processing module 11, 11' to 11", 12_1 to 12_k, 12'_1 to 12'_k', 12" 1 to 12"_k", 211, 212_1 to 212_m, 311, 312_1 to 312_k, 321, 322_1 to 322_r selected to perform the step S11_2 informs the at least one controlling processing module 11, 11' to 11", 211, 311, 321 on presence of the parallel executable part. Via receiving the information, the at least one controlling processing module 11, 11' to 11", 211, 311, 321 detects the presence of said parallel executable part, selects for each of the parts of the data file a corresponding processing module 11, 11' to 11", 12_1 to 12_k, 12'_1 to 12'_k', 12" 1 to 12"_k" 211, 212_1 to 212_m, 311, 312_1 to 312_k, 321, 322_1 to 322_r and commands the corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r to generate the corresponding data packet. After receipt of data packets from each of the selected processing modules 11, 11' to 11", 12_1 to 12_k, 12'_1 to 12'_k', 12"_1 to 12"_k", 211, 212_1 to 212_m, 311, 312_1 to 312_k, 321, 322_1 to 322_r, the at least one controlling processing module 11, 11' to 11", 211, 311, 321 provides them to the processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r selected to perform the step S11_2.

In step S12_6, the generated data packets are provided to the client 92. Since a plurality of data packets is available, the part of the executable code coding the step S12_6 represents a parallel executable part that comprises a program loop, in which for each data packet the transmission is performed. Thus, the part of the executable code coding the step S126 is executed as indicated by FIGS. 5a and 8a. The corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r selected to perform the step S11_2 informs the at least one controlling processing module 11, 11' to 11", 211, 311, 321 on presence of the parallel executable part. Via receiving the information, the at least one controlling processing module 11, 11' to 11", 211, 311, 321 detects the presence of said parallel executable part, selects for each of the data packets a corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r and commands the corresponding processing module 11, 11' to 11", 12_1 to 12_k, 12'_1 to 12'_k', 12"_1 to 12"_k", 211, 212_1 to 212_m, 311, 312_1 to 312_k, 321, 322_1 to 322_r to transmit the corresponding data packet to the client 92. After transmitting of all data packets, the at least one controlling processing module 11, 11' to 11", 211, 311, 321 indicates the completed transmission to the processing module 11, 11' to 11", 12_1 to 12_k, 12'_1 to 12'_k', 12"_1 to 12"_k" 211, 212_1 to 212_m, 311, 312_1 to 312_k, 322_1 to 322_r selected to perform the step S11_2.

After completion of the step S12_6, since the requested data has been provided to the client 92, the execution of the step S11_2 is completed.

If, after the execution of the step S12_4, it is determined that for visualizing the data file of the corresponding type a further processing is necessary, e.g. by use of an interpreter, the processing module 11, 11' to 11", 121 to 12_k, 12'_1 to 12'_k', 12"_1 to 12"_k", 211, 212_1 to 212_m, 311, 312_1 to 312_k, 321, 322_1 to 322_r selected to perform the step S11_2 performs the further processing of the data file in step S12_7, e.g. by executing a corresponding interpreter, such that the data file obtained after the processing may be visualized and may be provided to the client.

If the processing of the data file is not successful, e.g. due to errors during the processing, a corresponding error handling procedure is performed in step S12_2. Otherwise, in step S12_8, a partitioning of the obtained data file for generating data packets is performed as already explained with regard to the step S12_5.

Then, when the data packets for transmitting the obtained data file have been generated, the transmitting of the data packets is performed in step S12_9 in the same way as already explained with regard to the step S12_6.

After completion of step S12_9, since the requested data has been provided to the client 92, the execution of the step S11_2 is completed.

Additionally, after executing the step S12_7 successfully, i.e. after successful performing the further processing of the data file, it may happen that there is no data to be provided to the client. For example, the processing of the data did not produce return data but performed just some functions. In this case, the execution of the step S11_2 is completed with the successful execution of the step S12_7, which did not provide any return data.

Further, the error handling in step S12_2 may be performed in many ways. For example, the error handling may generate an error message that is transmitted by the server 91, 94 to the client 91. The skilled person is aware of error handling and will know that several appropriate procedures are implemented in step S12_2. In any case, the execution of the step S11_2 is completed after finishing the error handling in step S12_2.

Figure 13:
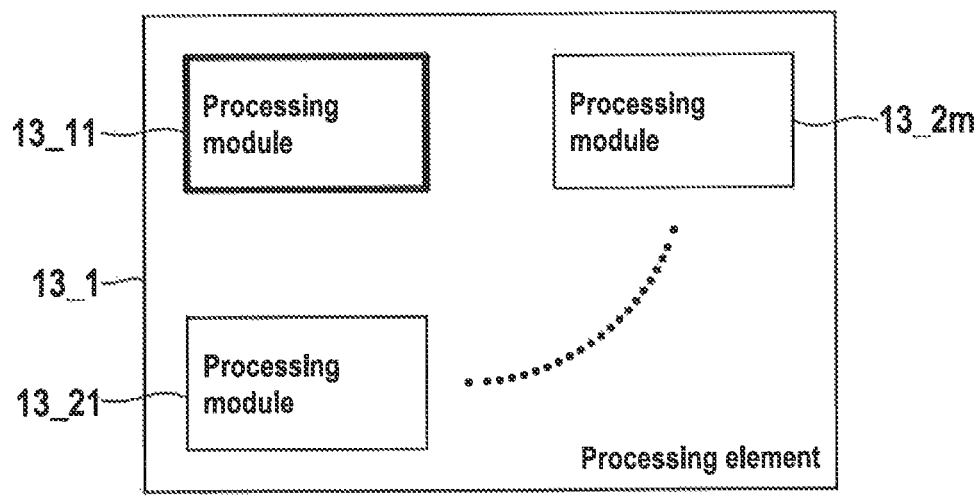
FIG. 13 shows an implementation of a set of processing modules according to an embodiment of the present invention.

FIG. 13 shows an implementation of a set of processing modules 13_11, 13_21 to 13_2n according to an embodiment of the present invention. The set of processing modules 13_11, 13_21 to 13_2m is located on processing element 13_1 that, according to the present embodiment, is a cell chip or cell processor 13_1 generally known to the skilled person. The processing module 13_11 represents a power processor element (PPE) and the processing elements 13_21 to 13_2m represent synergistic processing elements (SPEs), wherein PPE and SPEs are well known to the skilled person.

Figure 14A:
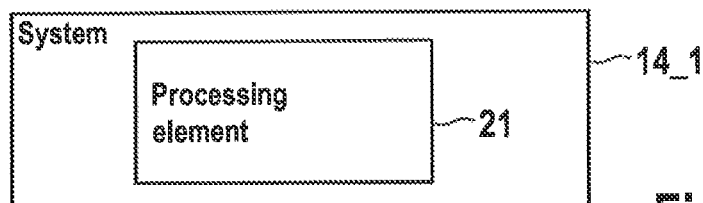
FIG. 14a shows an implementation of a system comprising one processing element according to an embodiment of the present invention.

FIG. 14a shows an implementation of a system 14_1 comprising one processing element according to an embodiment of the present invention. According to the present embodiment, the processing element 21 is a cell chip or a cell processor and may be arranged as indicated in FIG. 13. The system 14_1 may comprise a board, on which the processing element 21 is arranged.

Figure 14B:
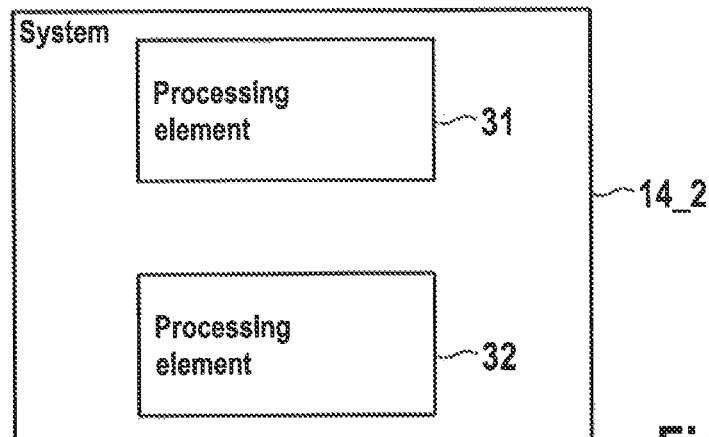
FIG. 14b shows an implementation of a system comprising two processing elements according to an embodiment of the present invention.

FIG. 14b shows an implementation of a system 14_2 comprising two processing elements 31, 32 according to an embodiment of the present invention. According to the present embodiment at least one of the two processing elements 31, 32 is a cell chip or a cell processor and may be arranged as indicated in FIG. 13. The system 142 may comprise at least one board, on which the processing elements 31, 32 are arranged.

FIG. 15 shows an implementation of a system 15_1 comprising a processing element 15_11 according to an embodiment of the present invention. The processing element 15_11 is arranged as explained above with regard to FIG. 2 or FIG. 14a. The set of processing modules (not shown in FIG. 15) located on the processing element 15_11 is configured as explained in the present application. According to the present embodiment, the system 15_1 is a printed circuit board (PCB). Further, the system 15_1 comprises at least one memory module 15_12, 15_13 that is connected to the processing element 15_11 and, thus, provides memory capacity to the processing element 15_11. Particularly, the at least one memory module 15_12, 15_13 provides memory capacity to the set of processing modules located on the processing element 15_11. The at least one memory module 15_12, 15_13 may be, for example, a random access memory (RAM). Further, the system 15_1 comprises a power supplying module 15_14 that supplies power to the at least one memory module 15_12, 15_13. Further, the system 15_1 comprises a power supplying module 15_15 that supplies power to the processing element 15_11. The system 15_1 comprises a communication module 15_19 that receives data from outside of the system 15_1, e.g. a network, and provides the received data to the processing element 15_11 and, thus, to its processing modules, and/or that receives data from the processing element 15_11 and, thus, from its processing modules, and provides the received data to the outside of the system 15_1, e.g. a network. The communication module 15_19 is a network chip module, a peripheral component interconnect express switch or uplink module, for example. Further, the system 15_1 comprises a firmware module 15_17 that comprises software for operating the system 15_1. The firmware module 15_17 may be, for example, a flash, a field-programmable gate array or unified extensible firmware interface. The system 15_1 may comprise also a power supplying module 15_18 that supplies power to the firmware module 15_17. Additionally, the system 15_1 comprises a connecting module 15_16 that connects the firmware module 15_17, the communication module 15_19 and the processing element 15_11. The connecting module 15_16 may be, for example, an interconnect chip that is configured to manage input/output (I/O) functions. Furthermore, the system 15_1 comprises a common interface module 15_10, via which power, network, management and/or hardware or hard drive connectivity is provided to the system 15_1. The common interface module 15_10 may be, for example, a peripheral component interconnect (PCI) or peripheral component interconnect express (PCI Express). The power supply interface 15_10 supplies power to the power supplying modules 15_14, 15_18 and 15_15. Additionally the power supply interface 15_10 supplies power to the communication module 15_19.

According to the present embodiment, the modules/components of the system 15_1 are arranged and connected to each other such that the least possible connection lines and/or connectors are necessary. Thus, modules/components that are connected to each other/interact with each other are located near to each other as can be derived from FIG. 15. In this way, the energy consumption, signal noise produced by the modules/elements/components, space required by the modules/elements/components, shielding of the modules/elements/components and/or cooling efforts for the modules/elements/components may be reduced.

Figure 16:
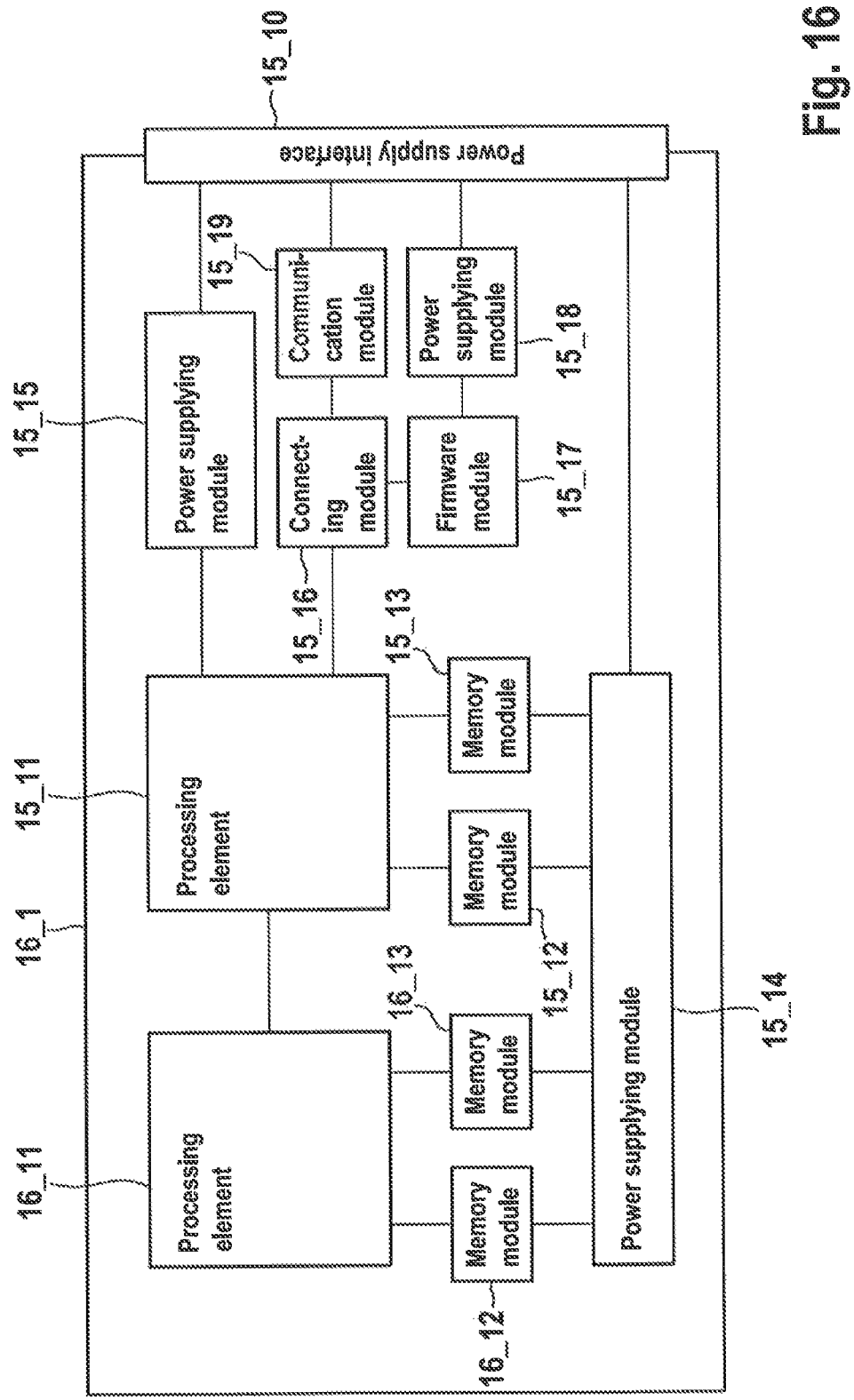
FIG. 16 shows an implementation of a system comprising two processing elements according to an embodiment of the present invention.

FIG. 16 shows an implementation of a system 16_1 comprising two processing elements 15_11, 16_11 according to an embodiment of the present invention. The system 16_1 is based on the arrangement of the system 15_1 of FIG. 15, as it may be recognized by the components with the same references. The two processing elements 15_11, 16_11 may be arranged as explained with regard to FIG. 3 or 14*b*. The set of processing modules (not shown in FIG. 15) located on the processing elements 15_11, 16_11 is configured as explained in the present application. In addition to the arrangement of FIG. 15, the system 16_1 of the present embodiment comprises at least one further memory module 16_12, 16_13 that is connected to the processing element 16_11 and, thus, provides memory capacity to the processing element 16_11. Particularly, the at least one further memory module 16_12, 16_13 provides memory capacity to the set of processing modules or at least one of the processing modules located on the processing element 16_11. The at least one further memory module 16_12, 16_13 may be, for example, a random access memory (RAM). Due to the presence of the at least one further memory module 16_12, 16_13, the power supplying module 15_14 is additionally configured to supply power also the at least one further memory module 16_12, 16_13. The two processing elements 15_11, 16_11 are connected to each other for exchanging data. Additionally, the processing elements 15_11, 16_11 are connected to each other for supplying power from the power supplying module 15_15 to the processing element 16_11 via the processing element 15_11.

Also according to the present embodiment, the modules/components of the system 16_1 are arranged and connected to each other such that the least possible connection lines and/or connectors are necessary. Thus, modules/components that are connected to each other/interact with each other are located near to each other as can be derived from FIG. 16. In this way, the power consumption in the system 16_1 is reduced.

Figure 17:
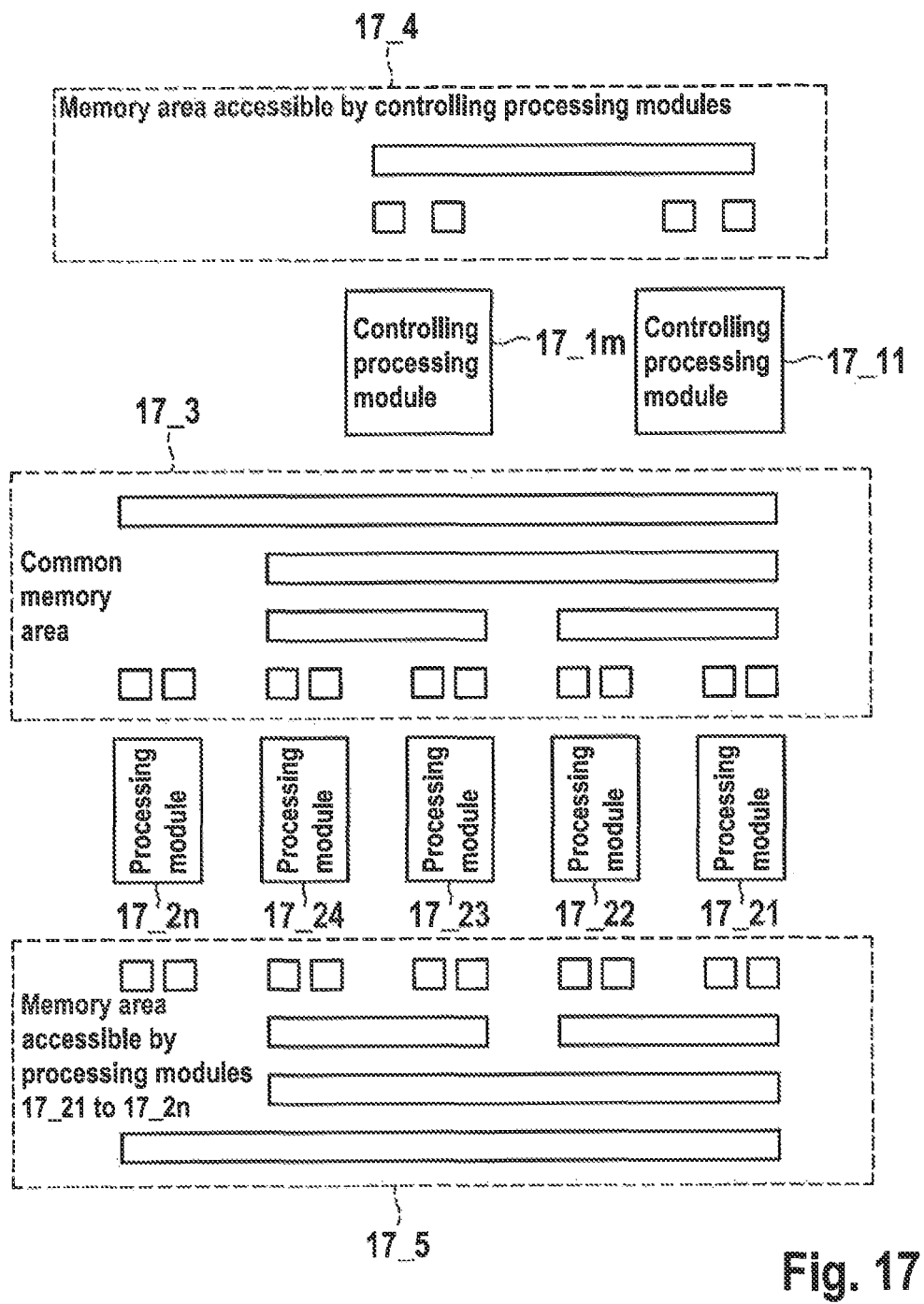
FIG. 17 shows an implementation of a set of processing modules according to an embodiment of the present invention.

FIG. 17 shows an implementation of a set of processing modules 17_11 to 17_1m and 17_21 to 17_2n according to an embodiment of the present invention. According to the present embodiment, the processing modules 17_11 to 17_1m correspond to the controlling processing modules. Further, memory area 17_4 that is accessible by the controlling processing modules only is provided, and memory area 17_5 that is accessible by the further processing modules 17_21 to 17_2n only is provided. In addition, also a memory area 17_3 that is accessible by all processing modules 17_11 to 17_1m and 17_21 to 17_2n is given. The presence of each of the memory areas 17_4, 17_5 is optional. Each of the memory areas 17_4, 17_5 may comprise parts that are accessible by at least one particular processing module 17_11 to 17_1m and 17_21 to 17_2n only. However, it is ensured that each of the processing modules 17_11 to 17_1m and 17_21 to 17_2n has access to the corresponding memory area 17_4, 17_5. In the common memory area 17_3, the situation is the same, wherein it is ensured that each part of the common memory area 17_3 is accessed by at least one controlling processing module 17_11 to 17_1m and by at least one further processing module 17_21 to 17_2n.

When considering the embodiments of FIG. 15 of 16, the memory areas 17_3, 17_4, 17_5 may be implemented in memory modules 15_12, 15_13, 16_12, 16_13 such that they may be accessed also by other components. According to another embodiment of the present invention, the memory area 17_4 that is accessible by controlling processing modules 17_11, 171m only may be implemented in memory modules 15_12, 15_13, 16_12, 16_13, while the other memory areas 17_3, 17_5 may be parts of the corresponding processing element(s), on which the processing modules 17_11 to 17_1m and 17_21 to 17_2n are arranged. According to another embodiment of the present invention, at least one of the memory areas 17_3 and 17_5 may be at least partially be located on the corresponding one or more processing elements, on which the processing modules 17_11 to 17_1m and 17_21 to 17_2n are arranged.

According to a further embodiment of the present invention, the selecting of the processing modules 17_11 to 17_1m and 17_21 to 17_2n is done by taking into account the scheduling for accessing the common memory area 17_3. The processing module 17_11 to 17_m and 17_21 to 17_2n that will access the common memory area 17_3 next and that is connected to the corresponding commanding processing module 17_11 to 17_1m performing the selection may be selected by the corresponding commanding processing module 17_11 to 17_1m for performing a parallel executable task. When selecting a certain number of processing modules 17_11 to 17_1m and 17_21 to 17_2n, the selecting is performed by the corresponding commanding processing module 17_11 to 17_1m by taking the certain number of processing modules 17_11 to 17_1m and 17_21 to 17_2n that will access the common memory area 17_3 next. Since the data exchange between the controlling processing modules 17_11 to 17_1m and the selected processing modules 17_11 to 17_1m and 17_21 to 17_2n is realized via the common memory area 17_3, such selecting saves run time required for executing the code by the processing modules 17_11 to 17_1m and 17_21 to 17_2n. It is ensured, that processing module 17_11 to 17_1m and 17_21 to 17_2n that has one of the last places in the scheduling for access to the common memory 17_3 has not to wait a long time for being able to start with the execution of the corresponding one or more parallel executable steps.

With regard to the embodiments explained above, it has to be noted that said embodiments may be combined with each other. Thus, for example, the selecting of processing modules as explained with regard to FIG. 17 may be used in any of the other examples. The configuration of the processing modules of one embodiment is combinable and exchangeable with configurations of each another embodiment. Additionally, it has to be noted that the modules as presented in FIGS. 15 and 16 that do not represent the processing modules or elements may be seen as optionally provided and that also further arrangements around the processing modules or elements are possible, wherein it is desired to keep the connection lines between the modules/elements/components of the corresponding system as short as possible to enable reduction of energy consumption of the system.

Other embodiments will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for executing an executable code by a plurality of processing modules, wherein the method comprises executing the executable code by at least one first processing module of the plurality of processing modules, wherein said executable code comprises a set of parallel executable parts, wherein each parallel executable part of the executable code comprises at least two parallel executable steps, and wherein said executing comprises:
  detecting by the at least one first processing module a parallel executable part of the set of parallel executable parts of the executable code to be executed;
  selecting by the at least one first processing module at least two second processing modules of the plurality of processing modules;
  commanding by the at least one first processing module the selected at least two second processing modules to perform the at least two parallel executable steps of the detected parallel executable part of the executable code;
  wherein the at least one first processing module is one of the selected at least two processing modules, wherein the at least one first processing module is configured to perform parallel executable steps of the detected parallel executable part of the executable code;
  wherein each parallel executable part of the set of parallel executable parts of the executable code comprises steps of one certain parallelization type;
  wherein two parallelization types are distinct;
  wherein a first parallelization type comprises program loops and wherein the second parallelization type comprises conditional branches; and
  wherein (a) if detected parallel executable part of the set of parallel executable parts of the executable code comprises steps of a program loop as the at least two parallel executable steps, the at least one first processing module allocates a certain number of cycles of the program loop to each of the selected at least two second processing modules, wherein each cycle of the program loop is allocated to one of the selected at least two second processing modules, or (b) if the detected parallel executable part of the executable code comprises at least two conditional branches as the at least two parallel executable steps, the at least one first processing module allocates each condition of the at least two conditional branches to one of the selected at least two second processing modules and each part of code of the at least two conditional branches coded with regard to one condition of the at least two conditional branches to one of the selected at least two second processing modules.

2. The method according to claim 1, wherein said commanding comprises allocating each of the at least two of the parallel executable steps of the detected parallel executable part of the executable code to one of the selected at least two second processing modules by the at least one first processing module.

3. The method according to claim 1, wherein each of the selected at least two second processing modules is commanded to perform at least one of the at least two parallel executable steps of the detected parallel executable part of the executable code.

4. The method according to claim 1, wherein the selected at least two second processing modules comprise the at least one first processing module.

5. The method according to claim 1, wherein a first and second parallel executable part of the executable code are performed if a first part of the executable code is comprised in a second part of the executable code.

6. The method according to claim 1, wherein:
  if the detected parallel executable part of the executable code comprises a set of program loops as the at least two parallel executable steps, the at least one first processing module allocates each of the program loops of the set of program loops to one of the selected at least two second processing modules; or
  if the detected parallel executable part of the executable code comprises at least two conditional branches as the at least two parallel executable steps, the at least one first processing module allocates each conditional branch to one of the selected at least two second processing modules.

7. A plurality of processing modules, wherein the plurality of processing modules each comprise at least one processor, the plurality of processing modules comprising at least one first processing module configured to:
  execute an executable code from a non-transitory medium, wherein said executable code comprises a set of parallel executable parts, wherein each parallel executable part of said set of parallel executable parts of the executable code comprises at least two parallel executable steps;

detect a parallel executable part of the set of parallel executable parts of the executable code as a part of the executable code to be executed;

select at least two second processing modules of a set of processing modules;

command the selected at least two second processing modules to perform the at least two parallel executable steps of the detected parallel executable part of the executable code;

wherein the at least one first processing module is one of the selected at least two processing modules, wherein the at least one first processing module is configured to perform parallel executable steps of the detected parallel executable part of the executable code;

wherein each parallel executable part of the set of parallel executable parts of the executable code comprises steps of one certain parallelization type;

wherein two parallelization types are distinct;

wherein a first parallelization type comprises program loops and wherein the second parallelization type comprises conditional branches; and wherein (a) if detected parallel executable part of the set of parallel executable parts of the executable code comprises steps of a program loop as the at least two parallel executable steps, the at least one first processing module allocates a certain number of cycles of the program loop to each of the selected at least two second processing modules, wherein each cycle of the program loop is allocated to one of the selected at least two second processing modules, or (b) if the detected parallel executable part of the executable code comprises at least two conditional branches as the at least two parallel executable steps, the at least one first processing module allocates each condition of the at least two conditional branches to one of the selected at least two second processing modules and each part of code of the at least two conditional branches coded with regard to one condition of the at least two conditional branches to one of the selected at least two second processing modules.

8. The plurality of processing modules according to claim 7, wherein the at least one first processing module is configured to execute said commanding by allocating each of the at least two of the parallel executable steps of the detected parallel executable part of the executable code to one of the selected at least two second processing modules.

9. The plurality of processing modules according to claim 7, wherein at least one first processing module configured to command each of the selected at least two second processing modules to perform at least one of the at least two parallel executable steps of the detected parallel executable part of the executable code.

10. The plurality of processing modules according to claim 7, wherein the selected at least two second processing modules comprise the at least one first processing module.

11. The plurality of processing modules according to claim 7, wherein the at least one first processing module is configured to command performing a first and a second parallel executable parts of the executable code if a first part of the executable code is comprised in a second part of the executable code.

12. The plurality of processing modules according to claim 7, the plurality of processing modules comprising a system for processing the executable code from the non-transitory medium.

13. The system according to claim 12, wherein the system for processing the executable code comprises at least one of the following:

one processing element comprising the plurality of processing modules or at least two processing elements comprising the plurality of processing modules;

at least one memory module connected to the one processing element or to one of the at least two processing elements and configured to provide memory capacity to the one processing element or to one of the at least two processing elements;

a first power supplying module configured to provide power to the at least one memory module;

a second power supplying module configured to provide power to the plurality of processing modules;

a communication module configured to: receive data from a network and to provide the received data to the plurality of processing modules and/or receive data from the plurality of processing modules and to transmit the received data to the network;

a firmware comprising software for the device;

a third power supplying module configured to provide power to the firmware; and/or a connecting module configured to connect to the firmware, the network chip module and the one processing element or to connect the firmware, the network chip module and the at least two processing elements; or a power supply interface module configured to provide power to the first, second and third power supplying modules and to the communication module.

14. The system for processing the executable code according to claim 13, wherein:

the one processing element comprises a cell processor or the at least two processing elements comprise at least one cell processor;

the at least one memory module comprises at least one random access memory;

the power supply interface module is a peripheral component interconnect or peripheral component interconnect express;

the communication module is a network chip module, a peripheral component interconnect express switch or uplink module;

the firmware is a flash, a field-programmable gate array or unified extensible firmware interface; or the connecting module is an interconnect chip that is configured to manage input/output functions.

15. The plurality of processing modules according to claim 7, wherein a set of processing modules are comprised within a server system for processing the executable code from the non-transitory medium.

16. A computer readable non-transitory medium comprising a program code, which, when executed by a computing device, causes the computing device to carry out a method, wherein the method comprises:

executing the executable code by at least one first processing module of the plurality of processing modules, wherein said executable code comprises a set of parallel executable parts, wherein each parallel executable part of the executable code comprises at least two parallel executable steps, and wherein said executing comprises:

detecting by the at least one first processing module a parallel executable part of the set of parallel executable parts of the executable code to be executed;

selecting by the at least one first processing module at least two second processing modules of the plurality of processing modules;

commanding by the at least one first processing module the selected at least two second processing modules to perform the at least two parallel executable steps of the detected parallel executable part of the executable code; wherein the at least one first processing module is one of the selected at least two processing modules, wherein the at least one first processing module is configured to perform parallel executable steps of the detected parallel executable part of the executable code;

wherein each parallel executable part of the set of parallel executable parts of the executable code comprises steps of one certain parallelization type;

wherein two parallelization types are distinct;

wherein a first parallelization type comprises program loops and wherein the second parallelization type comprises conditional branches; and wherein (a) if detected parallel executable part of the set of parallel executable parts of the executable code comprises steps of a program loop as the at least two parallel executable steps, the at least one first processing module allocates a certain number of cycles of the program loop to each of the selected at least two second processing modules, wherein each cycle of the program loop is allocated to one of the selected at least two second processing modules, or (b) if the detected parallel executable part of the executable code comprises at least two conditional branches as the at least two parallel executable steps, the at least one first processing module allocates each condition of the at least two conditional branches to one of the selected at least two second processing modules and each part of code of the at least two conditional branches coded with regard to one condition of the at least two conditional branches to one of the selected at least two second processing modules.

* * * * *